(12) United States Patent
Chen et al.

(10) Patent No.: US 11,783,522 B2
(45) Date of Patent: Oct. 10, 2023

(54) ANIMATION RENDERING METHOD AND APPARATUS, COMPUTER-READABLE STORAGE MEDIUM, AND COMPUTER DEVICE

(71) Applicant: TENCENT TECHNOLOGY (SHENZHEN) COMPANY LIMITED, Shenzhen (CN)

(72) Inventors: Haizhong Chen, Shenzhen (CN); Renjian Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 269 days.

(21) Appl. No.: 17/379,998

(22) Filed: Jul. 19, 2021

(65) Prior Publication Data

US 2021/0350601 A1    Nov. 11, 2021

Related U.S. Application Data

(63) Continuation of application No. PCT/CN2020/095013, filed on Jun. 9, 2020.

(30) Foreign Application Priority Data

Jun. 11, 2019  (CN) .......................... 201910501994.8

(51) Int. Cl.
  *G06T 13/00* (2011.01)
  *G06T 1/60* (2006.01)
  (Continued)

(52) U.S. Cl.
  CPC ................ *G06T 13/00* (2013.01); *G06T 1/60* (2013.01); *G06T 3/40* (2013.01); *G06T 9/40* (2013.01)

(58) Field of Classification Search
  CPC .. G06T 13/00; G06T 1/60; G06T 3/40; G06T 9/40; G06T 9/00; G06T 13/20; G06T 13/80; G06T 15/205; G11B 27/105
  See application file for complete search history.

(56) References Cited

U.S. PATENT DOCUMENTS 7,786,999 B1     8/2010  Reid
2006/0282855 A1 * 12/2006  Margulis ............... G06F 3/1446
                                              348/E5.002

(Continued)

FOREIGN PATENT DOCUMENTS

CN    103810738 A        5/2014
CN    109359262 A  *     2/2019    ......... H04N 21/2187
(Continued)

OTHER PUBLICATIONS

The World Intellectual Property Organization (WIPO) International Search Report for PCT/CN2020/095013 dated Sep. 9, 2020 5 Pages (including translation).

(Continued)

*Primary Examiner* — Said Broome
*Assistant Examiner* — Donna J. Ricks
(74) *Attorney, Agent, or Firm* — ANOVA LAW GROUP, PLLC

(57) ABSTRACT

An animation rendering method is provided. The method includes: obtaining an animation file in a target format; determining, in response to determining that the animation file is decoded, an animation drawing data interval meeting a stationary condition from animation drawing data obtained through decoding; caching initial animation drawing data in the animation drawing data interval; reading, in response to determining that animation drawing data corresponding to a to-be-played frame meets the stationary condition in a playback process of the animation file, the cached initial animation drawing data corresponding to the to-be-played (Continued)

frame; and performing animation rendering according to the read initial animation drawing data.

20 Claims, 16 Drawing Sheets

(51) Int. Cl.
*G06T 3/40* (2006.01)
*G06T 9/40* (2006.01)

(56) References Cited

U.S. PATENT DOCUMENTS

2014/0267303 A1\* 9/2014 Larkin .................... G06T 13/80
345/473
2016/0275108 A1 9/2016 Sidener

FOREIGN PATENT DOCUMENTS

| JP | 2004073351 A | 3/2004 | |
|----|---|---|---|
| JP | 2007018157 A | 1/2007 | |
| WO | WO-0007367 A2 \* | 2/2000 | ......... G06F 16/7328 |

OTHER PUBLICATIONS

The Japan Patent Office (JPO) Notification of Reasons for Refusal for Application No. 2021-563216 and Translation dated Dec. 13, 2022 5 Pages.

\* cited by examiner

ANIMATION RENDERING METHOD AND APPARATUS, COMPUTER-READABLE STORAGE MEDIUM, AND COMPUTER DEVICE

RELATED APPLICATION(S)

This application is a continuation application of PCT Patent Application No. PCT/CN2020/095013 filed on Jun. 9, 2020, which claims priority to Chinese Patent Application No. 201910501994.8, entitled "ANIMATION RENDERING METHOD AND APPARATUS, COMPUTER-READABLE STORAGE MEDIUM, AND COMPUTER DEVICE" and filed on Jun. 11, 2019, all of which are incorporated herein by reference in entirety.

FIELD OF THE TECHNOLOGY

The present disclosure relates to the field of image processing technologies, and in particular, to an animation rendering method and apparatus, a computer-readable storage medium, and a computer device.

BACKGROUND

With the continuous development of image processing technologies and network technologies, applications of animations are becoming increasingly extensive. For example, an animation is set on a page of a client, which can improve an appreciation effect of the page. Alternatively, when shooting a video by using a client, a user may select a corresponding animation, to synthesize the animation with the shot video, so that the shot video has an animation effect desired by the user.

During playback of the animation, a corresponding animation file may need to be decoded, to obtain animation data of a key frame. Next, animation data of a to-be-played animation frame is calculated according to the animation data of the key frame, and then is rendered and displayed on a screen. However, in a comparative rendering solution, animation data of a current to-be-played animation frame may need to be calculated according to animation data of a key animation frame, to obtain rendering data through rendering, which increases a calculation amount in a rendering process, and may affect the fluency of playback of the animation.

SUMMARY

According to embodiments of the present disclosure, an animation rendering method and apparatus, a computer-readable storage medium, and a computer device are provided.

In one aspect, the present disclosure provides an animation rendering method, performed by a computer device. The method includes: obtaining an animation file in a target format; determining, in response to determining that the animation file is decoded, an animation drawing data interval meeting a stationary condition from animation drawing data obtained through decoding; caching initial animation drawing data in the animation drawing data interval; reading, in response to determining that animation drawing data corresponding to a to-be-played frame meets the stationary condition in a playback process of the animation file, the cached initial animation drawing data corresponding to the to-be-played frame; and performing animation rendering according to the read initial animation drawing data.

In another aspect, the present disclosure provides an animation rendering apparatus, the apparatus including: a memory storing computer program instructions; and a processor coupled to the memory and configured to execute the computer program instructions and perform: obtaining an animation file in a target format; determining, in response to determining that the animation file is decoded, an animation drawing data interval meeting a stationary condition from animation drawing data obtained through decoding; caching initial animation drawing data in the animation drawing data interval; reading, in response to determining that animation drawing data corresponding to a to-be-played frame meets the stationary condition in a playback process of the animation file, the cached initial animation drawing data corresponding to the to-be-played frame; and performing animation rendering according to the read initial animation drawing data.

In yet another aspect, the present disclosure provides an animation rendering apparatus, the apparatus including: a file obtaining module, configured to obtain an animation file in a target format; a determining module, configured to determine, in response to determining that the animation file is decoded, an animation drawing data interval meeting a stationary condition from animation drawing data obtained through decoding; a data cache module, configured to cache initial animation drawing data in the animation drawing data interval; a data reading module, configured to read, in response to determining that animation drawing data corresponding to a to-be-played frame meets the stationary condition in a playback process of the animation file, the cached initial animation drawing data corresponding to the to-be-played frame; and an animation rendering module, configured to perform animation rendering according to the read initial animation drawing data.

In yet another aspect, the present disclosure provides a computer-readable storage medium is provided, storing a computer program, the computer program, when executed by a processor, causing the processor to perform: obtaining an animation file in a target format; determining, in response to determining that the animation file is decoded, an animation drawing data interval meeting a stationary condition from animation drawing data obtained through decoding; caching initial animation drawing data in the animation drawing data interval; reading, in response to determining that animation drawing data corresponding to a to-be-played frame meets the stationary condition in a playback process of the animation file, the cached initial animation drawing data corresponding to the to-be-played frame; and performing animation rendering according to the read initial animation drawing data.

Details of one or more embodiments of the present disclosure are provided in the accompanying drawings and descriptions below. Other features and advantages of the present disclosure become obvious with reference to the present disclosure, the accompanying drawings, and the claims.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In one or more embodiments of the present disclosure, the term "based on" is employed herein interchangeably with the term "according to."

Figure 1:
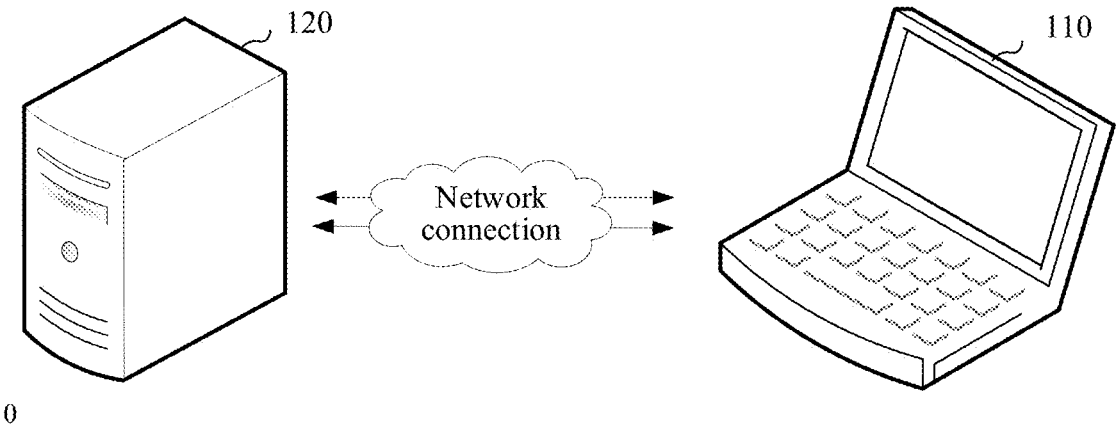
FIG. 1 is a schematic diagram of an application environment of an animation rendering method according to one or more embodiments of the present disclosure.

FIG. 1 is a diagram of an application environment of an animation rendering method according to an embodiment. Referring to FIG. 1, the animation rendering method is applied to an animation rendering system. The animation rendering system includes a terminal 110 and a server 120. The terminal 110 and the server 120 are connected by a network. The terminal 110 may be a desktop terminal or a mobile terminal. The mobile terminal may be at least one of a mobile phone, a tablet computer, a notebook computer, and the like. The server 120 may be implemented by using an independent server or a server cluster that includes a plurality of servers.

In one or more embodiments of the present disclosure, the term "computer device" is employed herein interchangeably with the term "computing device." The computing device may be a desktop computer, a server, a handheld computer, a smart phone, or the like.

Figure 2:
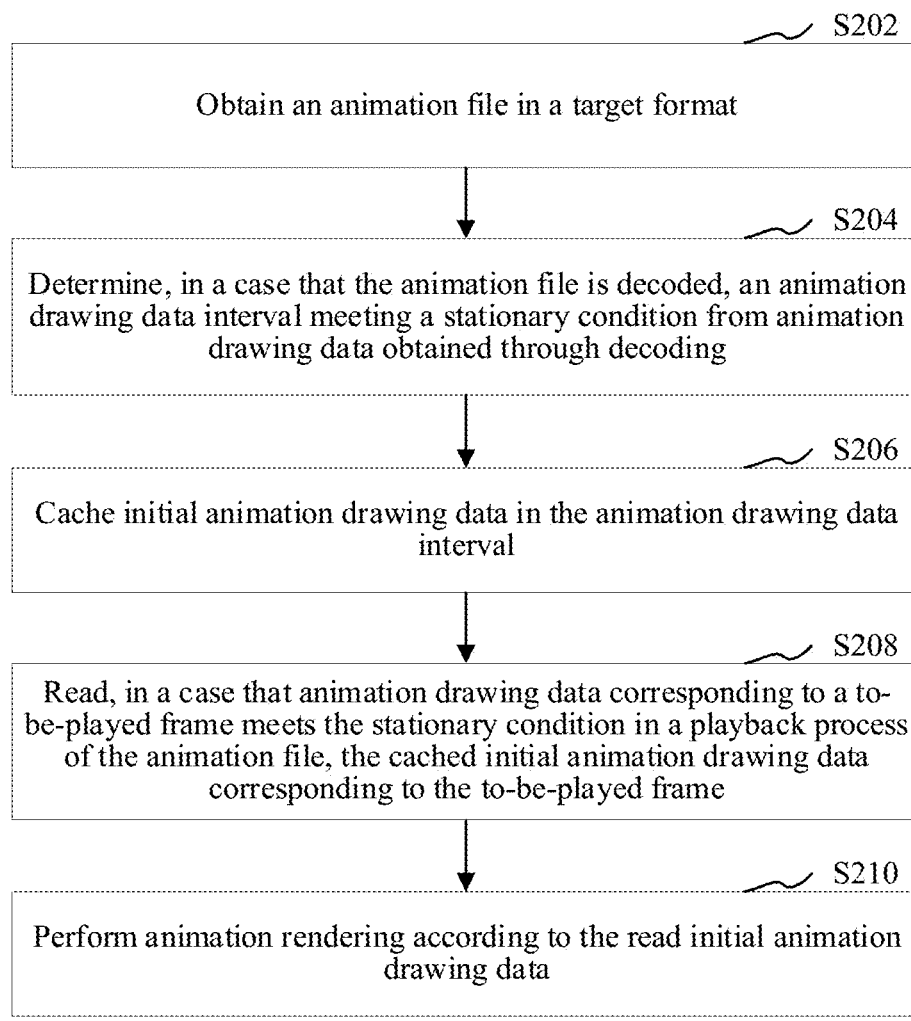
FIG. 2 is a schematic flowchart of an animation rendering method according to one or more embodiments of the present disclosure.

As shown in FIG. 2, in an embodiment, an animation rendering method is provided. In this embodiment, description is made by using an example in which the method is applied to the terminal 110 in FIG. 1. Referring to FIG. 2, the animation rendering method includes the following steps:

S202. Obtain an animation file in a target format.

The target format may be a PAG format, with a suffix name of PAG (or pag). An animation file in the PAG format may be obtained by integrating text, images, and other resources into a single file. In addition, an animation file in the PAG format uses a dynamic bit storage technology with an extremely high compression ratio. Moreover, cross-platform running may be implemented by using an animation file in the PAG format, and during running, text content, font size and style in the animation may be modified in a random and dynamic manner and image content may be further replaced, while an animation effect is maintained, thereby implementing a diversified animation content customizing effect.

In an embodiment, when detecting a trigger event, the terminal obtains an animation file in a target format. The trigger event may be an externally inputted operation instruction, such as an animation playback instruction.

In an embodiment, before S202, the method may further include: after an animation file is made by using an Adobe After Effects (AE) client, exporting the animation file in the target format by installing a PAG export plug-in on the AE client. In a process of exporting the animation file in the target format, the animation file may be encoded in a target coding manner. The target coding manner may be any one of Huffman coding, Shannon coding, run length code (RLC), Lenpel-Ziv&Welch (LZW) coding, arithmetic coding, predictive coding, transform coding, and quantization coding.

The installed PAG export plug-in is a plug-in that is developed for the AE client and configured to export a file in the target format. When an animation file is exported from the AE client, there may be at least three optional exporting manners. For example, an exporting manner such as vector composition exporting, sequence frame exporting, or video composition exporting is selected. A specific PAG export plug-in may need to be installed on the AE client, to export the animation file in the target format.

Animation rendering may be applied to animation playback in a specific application scenario. Therefore, manners of obtaining the animation file in S202 may be classified according to application scenarios of animation playback.

Scenario 1. Play an animation on a display page of a client.

In an embodiment, in a process of starting up the client, the terminal obtains an animation file in a target format from a locally-stored animation library. Alternatively, the terminal transmits an animation obtaining instruction to the server, and receives an animation file in a target format in response to the animation obtaining instruction, so as to play a starting animation on a starting page according to the animation file in the process of starting up the client. The starting page of the client is a type of display page.

For example, an animation effect is added to the starting page of the client. In the process of starting up the client, an animation file in a PAG format that is to be played on the starting page may be obtained, so as to play an animation on the starting page according to the animation file in the PAG format, thereby adding the animation effect to the starting page, and improving user experience.

In an embodiment, after the client is started up, if the display page is scrolled to a target position, the terminal obtains an animation file in a target format from a locally-stored animation library. Alternatively, the terminal transmits an animation obtaining instruction to the server, and receives an animation file in a target format in response to the animation obtaining instruction, so as to play, according to the animation file, a starting animation on the display page scrolled to the target position.

For example, when the display page of the client is scrolled to the bottom, an animation file in a PAG format that is to be played at the bottom of the display page may be obtained. Therefore, a user may view an animation when scrolling the display page to the bottom. Setting an animation effect on the display page of the client may improve user experience.

Scenario 2. Display an animation at a corresponding position in a video or an image when the video is played or the image is displayed on the client.

When a video or an image is shot, if it is set that a provided animation is selected on a shooting page, the shot video or image includes the corresponding animation. In an embodiment, when a video may need to be played, the terminal selects a designated video identifier according to an inputted selection instruction, obtains a corresponding Internet Protocol (IP) address according to the video identifier, and obtains a video file and a corresponding animation file according to the IP address, so as to play an animation at a set position in the video during playback of the video.

S204. Determine, when in response to determining that the animation file is decoded, an animation drawing data interval meeting a stationary condition from animation drawing data obtained through decoding.

The animation drawing data may be referred to as drawing data of a PAG animation, and may be data used for describing or drawing PAG animation content. Animation rendering may be performed according to the animation drawing data, and then the corresponding PAG animation content that is to be displayed may be obtained after being transmitted to the screen. Animation rendering is performed on a piece of instantaneous animation drawing data in the animation drawing data interval, and then the data is displayed on the screen, so that a frame of animation may be obtained. Therefore, the instantaneous animation drawing data is data forming an animation frame, and has a correspondence with the animation frame. The animation drawing data interval meeting the stationary condition may be a data interval in which the animation drawing data does not change within a time period.

The animation drawing data interval meeting the stationary condition may be understood as a stationary interval of the animation drawing data, that is, a stationary interval of an animation layer. When the animation file includes one animation layer, the animation drawing data interval is the stationary interval of the animation file. When the animation file includes a plurality of animation layers, an intersection between animation drawing data intervals is the stationary interval of the animation file. In the subsequent embodiments, unless otherwise specified, the animation drawing data interval is a drawing data interval meeting the stationary condition.

The stationary condition may refer to that a change does not occur within a time period. For example, on a macro level, the stationary condition may refer to that an animation does not change within a time period in a playback process (that is, the animation remains stationary within the time period). On a micro level, the stationary condition may refer to that animation drawing data forming animation frames does not change within a time period. Further, the animation drawing data is composed of group drawing data. Therefore, the stationary condition may refer to that the group drawing data does not change within a time period. Further, the group drawing data is composed of animation attribute values. Therefore, the stationary condition may alternatively refer to that the animation attribute values do not change within a time period. The animation attribute values may be colors, sizes, and fonts of words, motion parameters of the words, and the like in the animation. The animation attribute value is related to a change in time. For example, the animation attribute value may have a linear correlation with time, that is, the animation attribute value is proportionally increased or reduced as the time changes. For example, the animation attribute value may have a Bessel correlation with time, that is, the animation attribute value is in a Bessel curve as the time changes. The animation attribute value and the time may be alternatively in a hold type, that is, if the animation attribute value does not change within a time period, the animation attribute value meets the stationary condition.

The animation attribute value is a parameter value with a time axis attribute. The time axis attribute may be an attribute of the animation attribute value related to a change in time.

Each animation frame in an animation file may be formed by superposing a plurality of animation layers (that is, layers of an animation). The animation layer may be formed by smaller-granularity animation attribute groups. There are a total of six types of animation attribute groups. The six types of animation attribute groups include: transform, mask indicative of a mask in a layer, trackMatter indicative of a mask between layers, layerStyle indicative of a layer style, effect, and content. An animation attribute group of a content type includes drawable elements, such as images, text, and shapes. Therefore, the animation attribute group of the content type is a drawable element attribute group. Content included in the animation attribute group may be described by using corresponding animation attribute values. That is, the animation attribute values are elements in the animation attribute group. For example, during graphics rendering, for description of a shape, a shape of an animation may be described by using two types of animation attribute values, that is, path information and paint information.

In an embodiment, after the animation file in the target format is obtained, the terminal may load and decode the animation file by using the client, to obtain an animation file object. Then, the terminal traverses an animation attribute value list on the animation file object, and combines, according to corresponding animation attribute groups, animation attribute values obtained through traversing, to obtain group drawing data. The terminal combines the group drawing data according to a corresponding animation layer, to obtain animation drawing data.

In an embodiment, for a manner of determining an animation drawing data interval meeting a stationary condition, the terminal may first find animation attribute value intervals meeting the stationary condition. The animation drawing data includes group drawing data, and the group drawing data includes animation attribute values. Therefore, the terminal first calculates an intersection between animation attribute value intervals in an animation attribute group, uses the intersection between the animation attribute value intervals as a group drawing data interval meeting the stationary condition, and calculates the animation drawing data interval meeting the stationary condition by using a bubble algorithm.

S206. Cache initial animation drawing data in the animation drawing data interval.

Because the animation drawing data in the animation drawing data interval does not change with time, all pieces of instantaneous animation drawing data in the animation drawing data interval are the same. In addition, a piece of instantaneous animation drawing data in the animation drawing data interval has a correspondence with an animation frame. Therefore, when the animation drawing data is cached, the terminal may only need to cache initial animation drawing data in the animation drawing data interval, and may obtain, by using the initial animation drawing data, a picture in the corresponding animation frame through rendering.

In an embodiment, after determining the animation drawing data interval meeting the stationary condition, the terminal obtains initial animation drawing data in the animation drawing data interval, and then caches the obtained initial animation drawing data. The initial animation drawing data is instantaneous animation drawing data.

For example, for an animation file A, it is assumed that there are a total of 100 frames, and the animation in first ten frames is stationary, that is, animation drawing data of the first ten frames meets the stationary condition. Therefore, the terminal may obtain animation drawing data of a first frame in the first ten frames, and then caches the animation drawing data.

S208. Read, when in response to determining that animation drawing data corresponding to a to-be-played frame meets the stationary condition in a playback process of the animation file, the cached initial animation drawing data corresponding to the to-be-played frame.

In an embodiment, in a playback process, the terminal monitors a playback progress of the animation file in real time. If a current to-be-played frame is stationary, that is, animation drawing data corresponding to the to-be-played frame meets the stationary condition, the initial animation drawing data corresponding to the to-be-played frame is read from cache.

For example, for an animation file A, it is assumed that there are a total of 100 frames, and animation drawing data of first ten frames meets the stationary condition. In a process of playing the animation file A, if a second frame may need to be played after playback of a first frame is performed, because the animation drawing data of the first ten frames meets the stationary condition, the terminal may only need to read animation drawing data of the first frame from cache.

In an embodiment, a corresponding identifier may be set for each animation drawing data interval. When in response to determining that animation drawing data corresponding to a to-be-played frame meets the stationary condition in a playback process of the animation file, initial animation drawing data is read from cache according to the set identifier. The read initial animation drawing data corresponds to the to-be-played frame.

S210. Perform animation rendering according to the read initial animation drawing data.

In an embodiment, the terminal invokes a rendering tool to perform rendering on the read initial animation drawing data, to obtain visual animation rendering data, and then displays the animation rendering data on a screen.

For example, the terminal invokes a Web graphics library (WebGL), an open graphics library for embedded systems (OpenGL ES), or a 2.0 version of the OpenGL ES to perform rendering on the read initial animation drawing data, and then displays animation rendering data obtained through rendering on a screen.

In an example, for an animation file A, if there are a total of 100 frames, and the animation in first ten frames is stationary, during caching of animation drawing data, only animation drawing data corresponding to a first frame may need to be cached. When a second frame to a tenth frame are played, the terminal may only need to obtain the cached animation drawing data corresponding to the first frame, and performs rendering on the animation drawing data corresponding to the first frame. Therefore, animation rendering data of the second frame to the tenth frame may be obtained, and then the animation rendering data is displayed on a screen, to obtain the animation from the second frame to the tenth frame.

In the foregoing embodiment, the initial animation drawing data of the animation drawing data interval meeting the stationary condition is cached. When a corresponding animation frame whose attribute values meeting the stationary condition is to be displayed, initial animation drawing data corresponding to the to-be-played frame is directly obtained from cache, so that the animation file does not need to be parsed again to obtain initial animation drawing data corresponding to the to-be-played frame, reducing a calculation amount, and reducing a time consumed in a rendering process, thereby making playback of the animation smoother.

Figure 3:
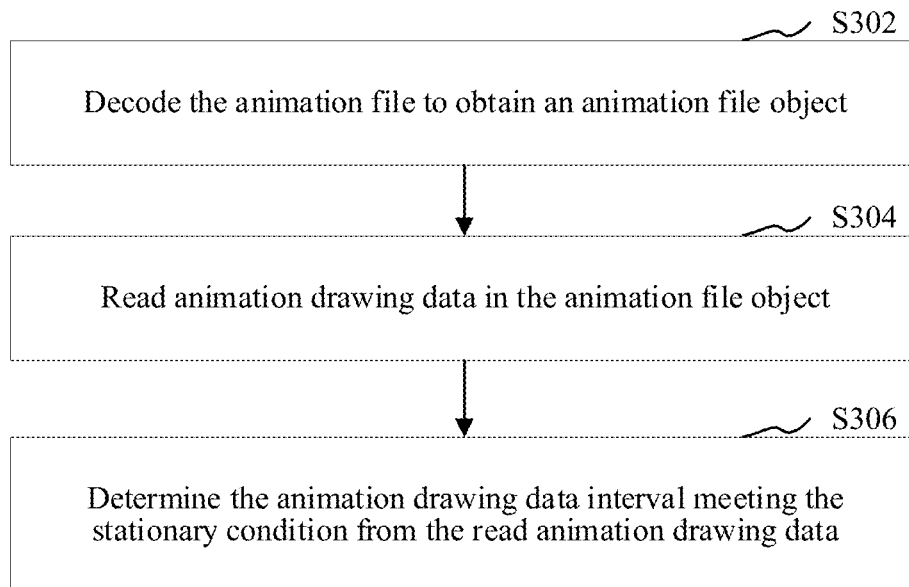
FIG. 3 is a schematic flowchart of steps of decoding an animation file to obtain animation drawing data and determining an animation drawing data interval according to one or more embodiments of the present disclosure.

In an embodiment, as shown in FIG. 3, S204 may include the following steps.

S302. Decode the animation file to obtain an animation file object.

The animation file object includes various types of data related to animation frames, for example, animation attribute values used for describing the animation and of the smallest-granularity.

In an embodiment, when the animation file may need to be played, the terminal parses the animation file in the target format by using the client, to obtain binary animation data. The terminal reads the binary animation data bit to obtain an animation file object in a bitwise manner.

In an embodiment, when there is more than one application playing the same animation in the client, the terminal only decodes the same animation file, and caches an animation file object obtained through decoding. When more than one application plays the same animation, the animation file object may be read from the cached animation file.

For example, when it is desirable to play the same animation, the client may only need to load the same animation file to an internal memory and decode the animation file to obtain an animation file object. When a plurality of same animations are simultaneously played, the cached animation file object is reused.

In an embodiment, when there is more than one application playing the same animation in the client, the terminal only decodes the same animation file to obtain an animation file object, and caches initial animation drawing data in an animation drawing data interval that meets a stationary condition and that is read by using the animation file object. When more than one application plays the same animation, initial animation drawing data corresponding to a to-be-played frame of each application may be read from cache.

S304. Read animation drawing data in the animation file object.

In an embodiment, the terminal traverses an animation attribute value list on the animation file object, and combines, according to corresponding animation attribute groups, animation attribute values obtained through traversing, to obtain group drawing data. The terminal combines the group drawing data according to a corresponding animation layer, to obtain animation drawing data.

S306. Determine the animation drawing data interval meeting the stationary condition from the read animation drawing data.

In an embodiment, for a manner of determining an animation drawing data interval meeting a stationary condition, the terminal may first find animation attribute value intervals meeting the stationary condition. The animation drawing data includes group drawing data, and the group drawing data includes animation attribute values. Therefore, the terminal first calculates an intersection between animation attribute value intervals in an animation attribute group, uses the intersection between the animation attribute value intervals as a group drawing data interval meeting the stationary condition, and calculates the animation drawing data interval meeting the stationary condition by using a bubble algorithm.

In an embodiment, when in response to determining that the animation file is played in more than one application, the terminal determines a playback progress corresponding to each application. When in response to determining that animation drawing data of a to-be-played frame corresponding to the playback progress meets the stationary condition, initial animation drawing data that is cached, corresponds to the playback progress, and is shared by the more than one application is read.

In the foregoing embodiment, the animation file is decoded to obtain an animation file object, animation drawing data in the animation file object is read, and then the animation drawing data interval meeting the stationary condition in the animation file object is found, so as to cache initial animation drawing data in the animation drawing data interval. Therefore, when a corresponding animation frame whose attribute values meet the stationary condition is to be played, initial animation drawing data corresponding to the to-be-played frame is directly obtained from cache, reducing a calculation amount, and reducing a time consumed in a rendering process, thereby making playback of the animation smoother.

Figure 4:
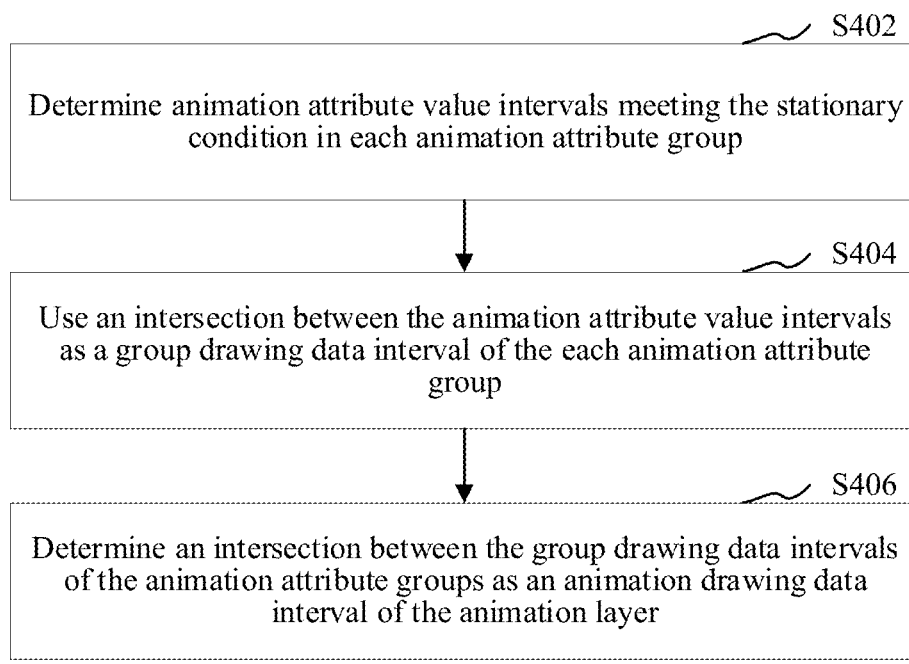
FIG. 4 is a schematic flowchart of a step of calculating an animation drawing data interval of an animation layer according to one or more embodiments of the present disclosure.

In an embodiment, as shown in FIG. 4, the animation file includes at least one animation layer; each animation layer includes at least two animation attribute groups; and each animation attribute group includes at least two animation attribute values. S204 may include the following steps.

S402. Determine animation attribute value intervals meeting the stationary condition in each animation attribute group.

There are a total of six types of animation attribute groups. The six types of animation attribute groups include: transform, mask, trackMatter, layerStyle, effect, and content. The animation attribute values are elements in the animation attribute group. For mask, the mask may be drawn by using path information and a mask mode. Therefore, the path information and the mask mode are animation attribute values of mask. The animation attribute value is a value related to a change in time. For example, the animation attribute value is proportionally increased or reduced as the time changes. Alternatively, the animation attribute value changes in a Bessel curve as the time changes. Alternatively, the animation attribute value does not change within a time period as the time changes.

The animation attribute value interval meeting the stationary condition may be understood as a stationary interval of an animation attribute value.

In an embodiment, the terminal searches an animation attribute value that does not change with time within a time period in an animation attribute group. The time period may be used as the animation attribute value interval meeting the stationary condition. The time period may be a time interval using specific time as a measurement unit, or may be a time interval using a frame as a measurement unit.

S404. Use an intersection between the animation attribute value intervals as a group drawing data interval of the each animation attribute group.

The group drawing data interval may be understood as a stationary interval of group drawing data, that is, a stationary interval of the animation attribute group.

In an embodiment, the terminal calculates an intersection between animation attribute value intervals, uses the intersection between the animation attribute value intervals as a group drawing data interval of each animation attribute group, and then performs S406, that is, calculates an animation drawing data interval of the animation layer by using a bubble algorithm.

In an embodiment, when in response to determining that there is no intersection between the animation attribute value intervals, initial animation attribute values of the animation attribute value intervals are cached. If there is no intersection between the animation attribute value intervals, it indicates that at least one animation attribute value in the animation attribute group changes with time. Therefore, the animation attribute group also changes with time, that is, the animation attribute group does not meet the stationary condition (that is, there is no stationary interval in the animation attribute group). However, there is at least one animation attribute value meeting the stationary condition in the animation attribute group, so that an animation attribute value interval meeting the stationary condition is found, and an initial animation attribute value of the animation attribute value interval is cached.

In an embodiment, when in response to determining that the animation attribute group is a drawable element attribute group, the animation attribute group includes at least two drawable elements; and each drawable element includes at least two animation attribute values. The method further includes: determining, by the terminal, the intersection between the animation attribute value intervals as an element interval of the each drawable element; and calculating an intersection between the element intervals of the drawable elements. S404 may include: determining the intersection between the element intervals as the group drawing data interval of the each animation attribute group.

There are six types of animation attribute groups, including: transform, mask, trackMatter, layerStyle, effect, and content. The animation attribute group of the content type is an indispensable part of the animation layer, which indicates drawable elements of the animation layer, such as shape, text, solid, PreCompose, and image. Other groups are obtained by performing processing, such as translation and scaling, adding a mask, and adding a filter effect, based on content. Due to diversity of content, specific drawable elements may need to be cached.

S406. Determine an intersection between the group drawing data intervals of the animation attribute groups as an animation drawing data interval of the animation layer.

The animation drawing data interval may be understood as a stationary interval of the animation drawing data, that is, a stationary interval of the animation layer.

In an embodiment, the terminal calculates an intersection between the group drawing data intervals, and determines the intersection between the group drawing data intervals as an animation drawing data interval of the animation layer.

The animation file is formed by at least one animation layer, and one animation layer corresponds to one piece of animation drawing data. The animation drawing data is composed of at least one piece of group drawing data, and a corresponding animation may be obtained after the animation drawing data is rendered and transmitted to a screen.

In an embodiment, when in response to determining that there is no intersection between the group drawing data intervals, initial group drawing data of the group drawing data intervals is cached. That there is no intersection between the group drawing data intervals indicates that there is at least one piece of group drawing data changing with time in the animation layer. Therefore, the animation layer also changes with time, that is, a group drawing data group does not meet the stationary condition. However, there is at least one piece of group drawing data meeting the stationary condition in the group drawing data group. Then, a group drawing data interval meeting the stationary condition is found, and initial group drawing data of the group drawing data interval is cached.

In an embodiment, when the animation file includes one animation layer, the terminal uses an animation drawing data interval as an animation stationary interval. When the animation file includes a plurality of animation layers, the terminal calculates an intersection between animation drawing data intervals of each animation layer, and uses the intersection of the animation drawing data intervals as an animation stationary interval.

When the animation file includes a plurality of animation layers, if an animation drawing data interval meeting the stationary condition exists, in the animation drawing data interval, an image or text in a corresponding animation layer does not change (that is, in a stationary state). When the animation file includes a plurality of animation layers, if an animation stationary interval exists, in the animation stationary interval, all images or text in the animation do not change (that is, in a stationary state).

In an embodiment, when in response to determining that the animation file further includes a pre-composed attribute group in addition to the animation layer, the pre-composed attribute group may be regarded as an animation subfile. The animation subfile may further include at least one animation layer and/or an embedded pre-composed attribute subgroup. For calculation of stationary intervals of the animation layer, animation attribute groups, and animation attribute values in the pre-composed attribute group, reference may be made to the manner in the foregoing embodiment.

Figure 5:
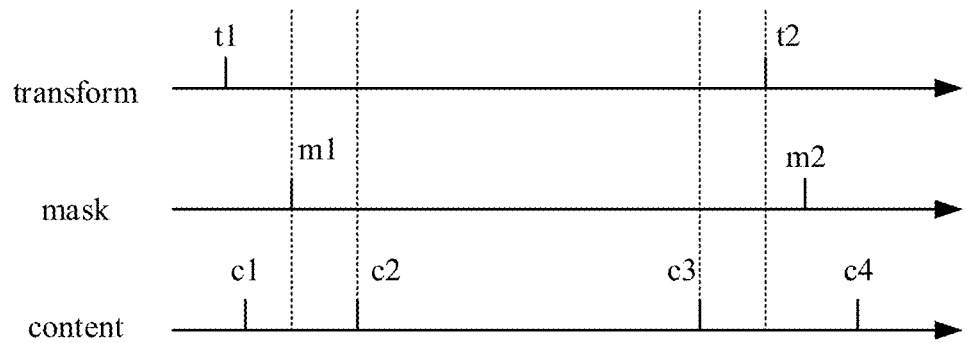
FIG. 5 is a schematic diagram of calculating a stationary interval of an animation layer according to one or more embodiments of the present disclosure.

In an example, as shown in FIG. 5, for an animation layer of the animation file, the animation layer includes three groups, which are respectively transform, mask, and content. [t1,t2] indicates a stationary interval of transform, that is, no transformation (such as translation, scaling, and rotation) is performed on the animation layer. [m1,m2] indicates a stationary interval of mask, that is, the animation layer always uses the same mask, and the mask does not change. [c1,c2] and [c3,c4] indicate stationary intervals of content, that is, the same text and the same image are respectively applied to the animation layer, the text does not change within [c1,c2], and the image does not change within [c3,c4]. t1, t2, m1, m2, c1, c2, c3, and c4 may be indicated by using frames. For example, t1 may indicate the first frame of the animation, m1 may indicate the third frame of the animation, and t2 may indicate the tenth frame of the animation.

For content, [c1,c2] and [c3,c4] are stationary intervals of content. When the animation file is played, the terminal may need to parse text at a c1 moment and an image at a c3 moment only once, and cache and mark the text and image that are obtained through parsing. During playback of the animation, when a frame that may need to be drawn is c, and c is in the interval of [c1,c2], the terminal does not need to parse text of the frame c again, may directly obtain group drawing data of the frame c1 from cache, and then obtain text through rendering according to the group drawing data of the frame c1. The text obtained through rendering are exactly the same as the text of the frame c.

Only a scenario of the content group is considered above. An animation layer usually includes a plurality of groups. For example, for an animation layer only including three groups, that is, transform, mask, and content, a stationary interval of the animation layer is an intersection between stationary intervals of transform, mask, and content. As shown in FIG. 5, there may be two stationary intervals, that is, [m1,c2] and [c3,t2], of the animation layer, for which reference may be made to parts obtained through truncation by dashed lines in FIG. 5.

In the foregoing embodiment, animation attribute value intervals meeting a stationary condition are first determined, and then an animation drawing data interval is calculated by using a bubble algorithm, so as to cache initial animation drawing data in the animation drawing data interval. Therefore, when a corresponding animation frame whose attribute values meet the stationary condition is to be played, the initial animation drawing data corresponding to the to-be-played frame is directly obtained from cache, reducing a calculation amount, and reducing a time consumed in a rendering process, thereby making playback of the animation smoother.

Figure 6:
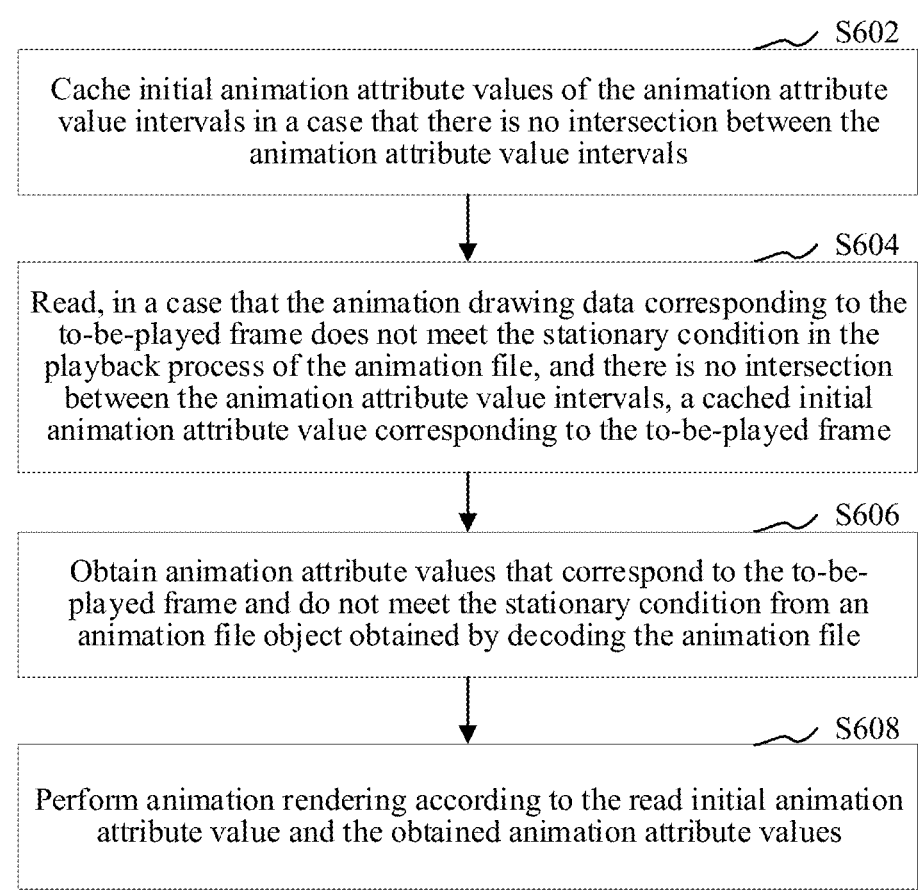
FIG. 6 is a schematic flowchart of a step of performing animation rendering according to an initial animation attribute value and obtained animation attribute values according to one or more embodiments of the present disclosure.

In an embodiment, as shown in FIG. 6, the method further includes the following steps.

S602. Cache initial animation attribute values of the animation attribute value intervals when in response to determining that there is no intersection between the animation attribute value intervals.

The animation attribute value interval may be understood as a stationary interval of an animation attribute value. That there is no intersection between the animation attribute value intervals indicates that there is at least one animation attribute value changes with time in the animation attribute group. Therefore, the animation attribute group also changes with time, that is, there is no stationary interval in the animation attribute group. However, there is at least one animation attribute value meeting the stationary condition in the animation attribute group, so that an animation attribute value interval meeting the stationary condition is found, and an initial animation attribute value of the animation attribute value interval is cached.

S604. Read, when in response to determining that the animation drawing data corresponding to the to-be-played frame does not meet the stationary condition in the playback process of the animation file, and there is no intersection between the animation attribute value intervals, a cached initial animation attribute value corresponding to the to-be-played frame.

The animation drawing data interval may be understood as a stationary interval of the animation drawing data, that is, a stationary interval of the animation layer. That the animation drawing data corresponding to the to-be-played frame does not meet the stationary condition in the playback process of the animation file, and there is no intersection between the animation attribute value intervals indicates that the animation drawing data corresponding to the to-be-played frame does not hit a corresponding stationary interval, and group drawing data corresponding to the to-be-played frame likewise does not hit a corresponding stationary interval.

In an embodiment, when the animation file is played, if the animation drawing data corresponding to the to-be-played frame hits a stationary interval, S208 is performed. If the animation drawing data corresponding to the to-be-played frame does not hit a stationary interval, the terminal continues to perform searching in a smaller-granularity level (that is, group drawing data) in the animation drawing data, to find whether group drawing data corresponding to the to-be-played frame hits a corresponding stationary interval. If the group drawing data corresponding to the to-be-played frame hits a corresponding stationary interval, initial group drawing data corresponding to the to-be-played frame is obtained from cache, and then group drawing data that corresponds to the to-be-played frame and that is in a non-stationary interval is further obtained through parsing from the animation file object. Therefore, the terminal may perform animation rendering according to the obtained initial group drawing data and the group drawing data obtained through parsing.

In an embodiment, if the animation drawing data corresponding to the to-be-played frame does not hit a corresponding stationary interval, and the group drawing data corresponding to the to-be-played frame likewise does not hit a corresponding stationary interval, the terminal continues to perform searching in a smaller-granularity level (that is, animation attribute values) in the group drawing data, to find whether animation attribute values corresponding to the to-be-played frame hit a corresponding stationary interval. If the animation attribute values corresponding to the to-be-played frame hit a corresponding stationary interval, an initial animation attribute value corresponding to the to-be-played frame is obtained from cache, and then S606 is performed.

Due to existence of a stationary interval, when a frame is to be played, all animation layers may need to be traversed. If a current to-be-played frame hits a stationary interval of an animation layer, for the animation layer, data of all frames in the entire stationary interval is the same. Therefore, corresponding initial animation drawing data may be directly obtained from cache. If the stationary interval of the animation layer is not hit, all groups of the animation layer are traversed again. If a stationary interval of a group is hit, the terminal directly uses initial group drawing data in the stationary interval of the group. In addition, group drawing data that corresponds to the to-be-played frame and that is in a non-stationary interval is obtained through parsing from the animation file object. If the stationary interval of the group is not hit, the terminal traverses all animation attribute values of the group. If a stationary interval of an animation attribute value is hit, the terminal directly uses an initial animation attribute value in the stationary interval of the animation attribute value. In addition, S606 is further performed.

S606. Obtain animation attribute values that correspond to the to-be-played frame and do not meet the stationary condition from an animation file object obtained by decoding the animation file.

In an embodiment, when the initial animation attribute value corresponding to the to-be-played frame is read, the terminal further obtains, through parsing, animation attribute values that correspond to the to-be-played frame and that are in non-stationary intervals from the animation file object. Therefore, the terminal may perform animation rendering according to the obtained initial animation attribute value and the animation attribute values obtained through parsing.

S608. Perform animation rendering according to the read initial animation attribute value and the obtained animation attribute values.

The animation drawing data of the to-be-played frame may be formed by animation attribute values in the stationary interval and animation attribute values in the non-stationary interval. For the animation attribute values in the stationary interval, the initial animation attribute value corresponding to the to-be-played frame may be directly read from cache, and does not need to be obtained through parsing from the animation file object.

In an embodiment, the terminal converts the read initial animation attribute value and the obtained animation attribute values into animation drawing data, and performs animation rendering according to the animation drawing data.

In the foregoing embodiment, when neither the animation layer nor the animation attribute group has a stationary interval, initial animation attribute values of animation attribute values that have stationary intervals are cached. When the to-be-played frame hits a stationary interval of an animation attribute value, an initial animation attribute value corresponding to the to-be-played frame is read from cache, and an animation attribute value in a stationary interval does not need to be obtained through parsing from the animation file object, reducing a calculation amount, and reducing a time consumed in a rendering process, thereby making playback of the animation smoother.

Figure 7:
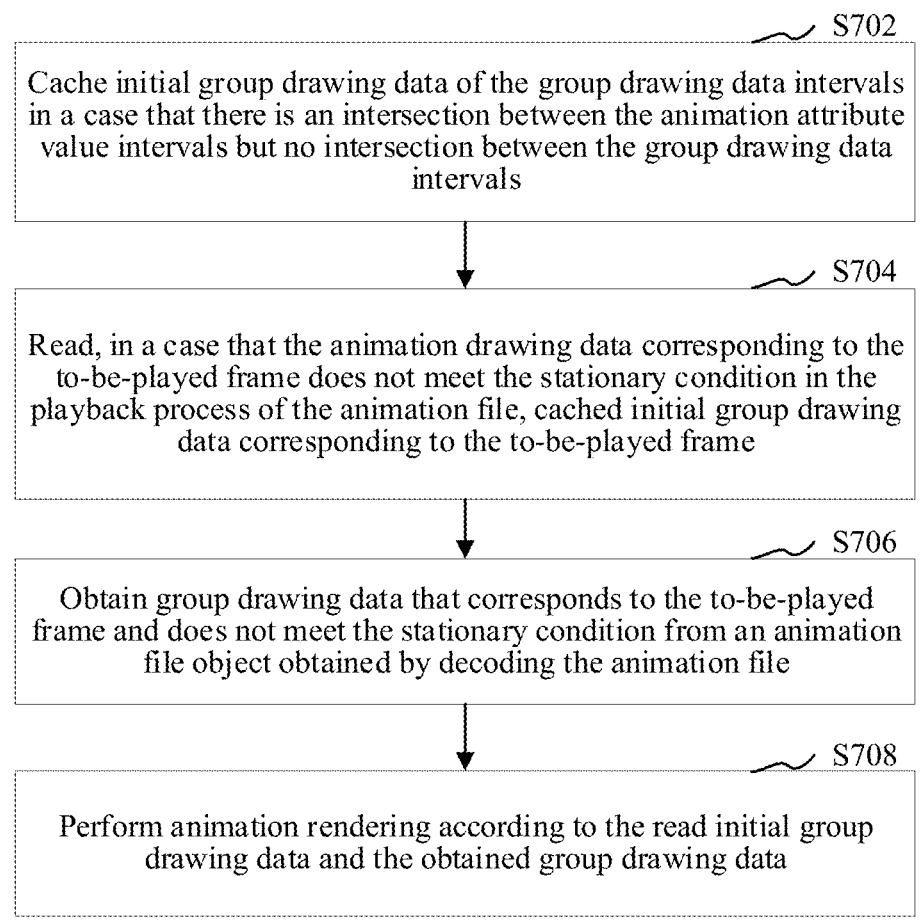
FIG. 7 is a schematic flowchart of a step of performing animation rendering according to initial group drawing data and obtained group drawing data according to one or more embodiments of the present disclosure.

In an embodiment, as shown in FIG. 7, the method further includes the following steps.

S702. Cache initial group drawing data of the group drawing data intervals when in response to determining that there is an intersection between the animation attribute value intervals but no intersection between the group drawing data intervals.

The animation attribute value interval may be understood as a stationary interval of an animation attribute value. That there is an intersection between the animation attribute value intervals indicates that all animation attribute values in an animation attribute group do not change with time. Therefore, there is a stationary interval in the animation attribute group. If there is no stationary interval in the animation layer, the terminal caches initial group drawing data of the group drawing data intervals.

S704. Read, when in response to determining that the animation drawing data corresponding to the to-be-played frame does not meet the stationary condition in the playback process of the animation file, cached initial group drawing data corresponding to the to-be-played frame.

The animation drawing data interval may be understood as a stationary interval of the animation drawing data, that is, a stationary interval of the animation layer. That the animation drawing data corresponding to the to-be-played frame does not meet the stationary condition in the playback process of the animation file, and there is an intersection between the animation attribute value intervals indicates that the animation drawing data corresponding to the to-be-played frame does not hit a corresponding stationary interval, but at least a part of data in group drawing data corresponding to the to-be-played frame hits a corresponding stationary interval.

In an embodiment, when the animation file is played, if the animation drawing data corresponding to the to-be-played frame hits a stationary interval, S208 is performed. If the animation drawing data corresponding to the to-be-played frame does not hit a stationary interval, the terminal continues to perform searching in a smaller-granularity level (that is, group drawing data) in the animation drawing data, to find whether group drawing data corresponding to the to-be-played frame hits a corresponding stationary interval. If the group drawing data corresponding to the to-be-played frame hits a corresponding stationary interval, initial group drawing data corresponding to the to-be-played frame is obtained from cache, and then S706 is performed.

S706. Obtain group drawing data that corresponds to the to-be-played frame and does not meet the stationary condition from an animation file object obtained by decoding the animation file.

In an embodiment, if the initial group drawing data corresponding to the to-be-played frame is read, the terminal further obtains, through parsing, group drawing data that corresponds to the to-be-played frame and that is in non-stationary intervals from an animation file object. Therefore, the terminal may perform animation rendering according to the obtained initial group drawing data and the group drawing data obtained through parsing.

S708. Perform animation rendering according to the read initial group drawing data and the obtained group drawing data.

The animation drawing data of the to-be-played frame may be formed by group drawing data in the stationary interval and group drawing data in the non-stationary interval. For the group drawing data in the stationary interval, the initial group drawing data corresponding to the to-be-played frame may be directly read from cache, and does not need to be obtained through parsing from the animation file object.

In an embodiment, the terminal converts the read initial group drawing data and the obtained group drawing data into animation drawing data, and performs animation rendering according to the animation drawing data.

In the foregoing embodiment, when there is no stationary interval in the animation layer, but there is a stationary interval in the animation attribute group, initial group drawing data of group drawing data that has stationary intervals is cached. When the to-be-played frame hits a stationary interval of group drawing data, initial group drawing data corresponding to the to-be-played frame is read from cache, and group drawing data in a stationary interval does not need to be obtained through parsing from the animation file object, reducing a calculation amount, and reducing a time consumed in a rendering process, thereby making playback of the animation smoother.

Figure 8:
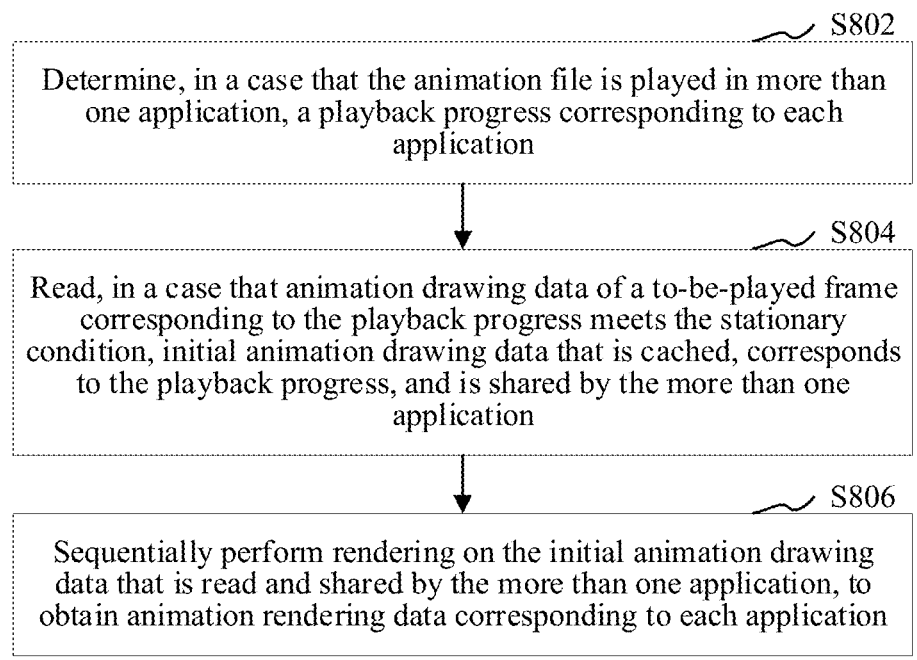
FIG. 8 is a schematic flowchart of a step of performing rendering by using shared animation drawing data when in response to determining that the same animation is played in a plurality of applications according to one or more embodiments of the present disclosure.

In an embodiment, as shown in FIG. 8, S208 may include the following steps.

S802. Determine, when in response to determining that the animation file is played in more than one application, a playback progress corresponding to each application.

That the animation file is played in more than one application may be that: the same animation may need to be played at a plurality of positions in the client. For example, a video player of the client plays a video, and the video carries an animation. The animation may also need to be played at a position on a display page in addition to the video player (when the video player is not in a full-screen mode, the video player is fixed at an upper position of the display screen, and the display page is scrolled to the bottom).

In an embodiment, when there is more than one application playing the same animation in the client, the terminal only decodes the same animation file, and caches an animation file object obtained through decoding. When more than one application plays the same animation, the animation file object may be read from the cached animation file.

For example, when it is desirable to play the same animation, the client may only need to load the same animation file to an internal memory and decode the animation file to obtain an animation file object. When a plurality of same animations are simultaneously played, the cached animation file object is reused.

In another embodiment, when there is more than one application playing the same animation in the client, the terminal only decodes the same animation file to obtain an animation file object, and caches initial animation drawing data in an animation drawing data interval that meets a stationary condition and that is read by using the animation file object. The cached initial animation drawing data may be shared by a plurality of applications during playback. When more than one application plays the same animation, the terminal may read initial animation drawing data corresponding to a to-be-played frame of each application from cache.

In another embodiment, when there is more than one application playing the same animation in the client, the terminal only decodes the same animation file to obtain an animation file object. If the animation drawing data read by using the animation file object does not meet the stationary condition, whether group drawing data of an animation attribute group meets the stationary condition is determined. If the group drawing data of the animation attribute group meets the stationary condition, initial group drawing data meeting the stationary condition is cached, and the cached initial group drawing data may be shared by a plurality of applications during playback. When more than one application plays the same animation, the terminal may read initial group drawing data corresponding to a to-be-played frame of each application from cache.

In another embodiment, when there is more than one application playing the same animation in the client, the terminal only decodes the same animation file to obtain an animation file object. If the animation drawing data read by using the animation file object does not meet the stationary condition, and group drawing data of an animation attribute group likewise does not meet the stationary condition, whether animation attribute values meet the stationary condition is determined. If the animation attribute values meet the stationary condition, initial animation attribute values meeting the stationary condition are cached, and the cached initial animation attribute values may be shared by a plurality of applications during playback. When more than one application plays the same animation, the terminal may read an initial animation attribute value corresponding to a to-be-played frame of each application from cache.

S804. Read, when in response to determining that animation drawing data of a to-be-played frame corresponding to the playback progress meets the stationary condition, initial animation drawing data that is cached, corresponds to the playback progress, and is shared by the more than one application.

That the animation drawing data of the to-be-played frame corresponding to the playback progress meets the stationary condition refers to that animation drawing data of the to-be-played frame corresponding to the playback progress has a stationary interval.

In an embodiment, when in response to determining that a plurality of applications plays the same animation, the terminal records a playback progress of the played animation in each application, and then determines, according to the playback progress, whether animation drawing data of a corresponding to-be-played frame hits a stationary interval. If the stationary interval of the animation drawing data is hit, initial animation drawing data that is cached, corresponds to the playback progress, and is shared by the more than one application is read. If the stationary interval of the animation drawing data is not hit, the terminal traverses group drawing data that is in the animation layer and used for forming the animation drawing data. If a stationary interval of the group drawing data is hit, the terminal directly uses initial group drawing data in the stationary interval. If the stationary interval of the group drawing data is not hit, the terminal traverses an animation attribute value that is in the animation attribute group and used for forming the group drawing data. If a stationary interval of the animation attribute value is hit, the terminal directly uses initial animation attribute values in the stationary intervals.

S806. Sequentially perform rendering on the initial animation drawing data that is read and shared by the more than one application, to obtain animation rendering data corresponding to each application.

In an embodiment, if neither the animation drawing data nor the group drawing data has a stationary interval, and the animation attribute value has a stationary interval, the terminal, on one hand, reads the initial animation attribute value shared by the more than one application, and on the other hand, obtains animation attribute values of non-stationary intervals through parsing from the shared animation file object, converts the read initial animation attribute value and the animation attribute values obtained through parsing into the animation drawing data, and performs rendering.

In an embodiment, if the animation drawing data does not have a stationary interval, but the group drawing data has a stationary interval, the terminal, on one hand, reads the initial group drawing data shared by the more than one application, and on the other hand, obtains group drawing data of non-stationary intervals through parsing from the shared animation file object, synthesizes the read initial group drawing data and the group drawing data obtained through parsing into the animation drawing data, and performs rendering.

In the foregoing embodiment, when in response to determining that a plurality of applications in the client plays the same animation, the plurality of applications share animation drawing data obtained by parsing the same animation file, and initial animation drawing data is cached. Therefore, on one hand, a caching space is reduced, and on the other hand, a calculation amount of parsing is reduced. When animation drawing data corresponding to each to-be-played frame meets the stationary condition, initial animation drawing data corresponding to the each to-be-played frame is obtained from cache, and animation drawing data in a stationary interval does not need to be obtained through parsing from the animation file object, reducing a calculation amount, and reducing a time consumed in a rendering process, thereby making playback of the animation smoother.

Figure 9:
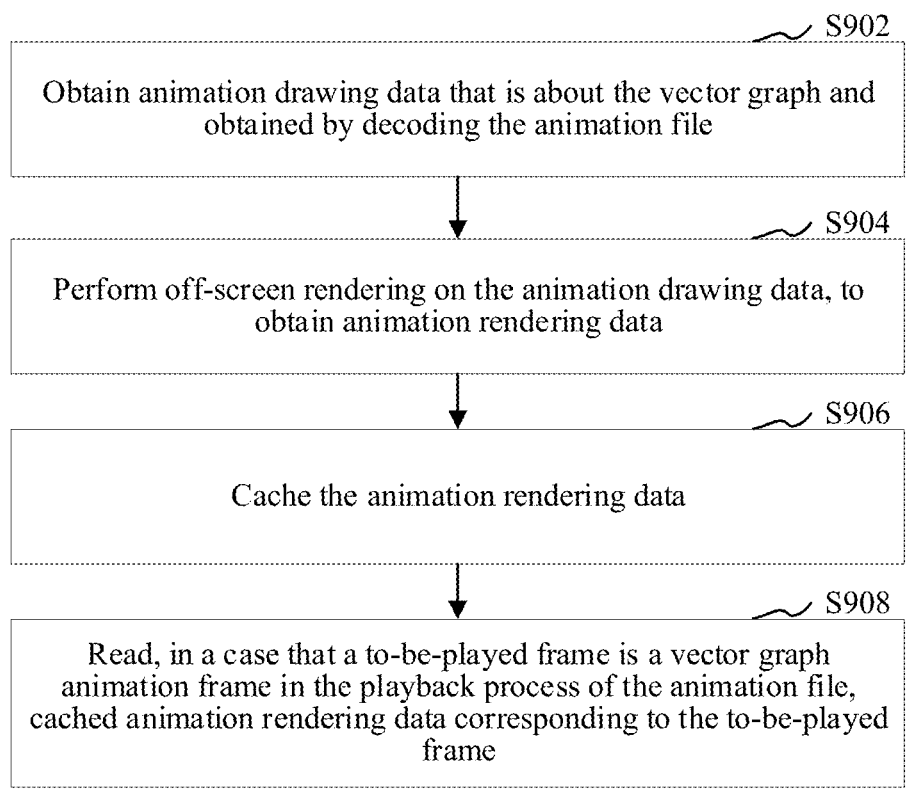
FIG. 9 is a schematic flowchart of steps of performing rendering to obtain animation rendering data and caching the animation rendering data according to one or more embodiments of the present disclosure.

In an embodiment, in addition to caching the animation drawing data, the animation rendering data may also be cached. The animation file includes a vector graph. As shown in FIG. 9, the method may further include the following steps.

S902. Obtain animation drawing data that is about the vector graph and obtained by decoding the animation file.

The vector graph is also referred to as an object-oriented image, which indicates an image by using geometric primitives based on mathematical equations, such as points, lines, or polygons, so that the image is not distorted during scaling up, scaling down, or rotation. Text (such as graphic text) in an animation also pertains to the vector graph.

For the vector graph, when the terminal caches the animation drawing data, the group drawing data, or the animation attribute value, it may be ensured that a piece of instantaneous description data of the animation may be directly obtained. However, calculation may further be needed to convert the description data into animation rendering data that can be displayed on a screen. Particularly, for a vector graph described by using complex path information, point coordinate information and path description information between points in the path information may need to be parsed one by one during rendering. In this way, the path information may be converted into a vector graph. This is also the case for description information of text. Only path information and paint information of the text in the animation drawing data are cached. Every time rendering is performed on these pieces of information, a calculation amount is large and a long time is consumed. Therefore, when the animation is played, the animation drawing data first may need to rendered to the animation rendering data, and then the animation rendering data is cached, so that corresponding animation rendering data is directly read from cache as required.

In an embodiment, when it is determined that the animation file includes a vector graph, the terminal obtains animation drawing data that is about the vector graph and obtained by decoding the animation file. Alternatively, the terminal determines, when in response to determining that the animation drawing data in the vector graph meets a stationary condition, an animation drawing data interval meeting the stationary condition, and obtains initial animation drawing data from the animation drawing data interval.

S904. Perform off-screen rendering on the animation drawing data, to obtain animation rendering data.

The animation rendering data may be image texture.

In an embodiment, S904 may include: performing, by the terminal, off-screen rendering on the animation drawing data obtained through decoding, to obtain animation rendering data; or performing, by the terminal, off-screen rendering on initial animation drawing data in an animation drawing data interval, to obtain animation rendering data.

S906. Cache the animation rendering data.

In an embodiment, before the animation rendering data is cached, the terminal determines a size of the animation rendering data, compresses, when in response to determining that the size of the animation rendering data is greater than a preset size threshold, the animation rendering data on the premise of ensuring the animation quality, to reduce the size of the animation rendering data, and then caches the compressed animation rendering data, thereby reducing an amount of cache.

S908. Read, when in response to determining that a to-be-played frame is a vector graph animation frame in the playback process of the animation file, cached animation rendering data corresponding to the to-be-played frame.

In an embodiment, when in response to determining that a to-be-played frame is a vector graph animation frame in the playback process, animation rendering data corresponding to the to-be-played frame is read from cache. Alternatively, when in response to determining that a to-be-played frame is a vector graph animation frame in the playback process, and animation drawing data corresponding to the to-be-played frame meets the stationary condition, animation rendering data that corresponds to the to-be-played frame and that is obtained by performing rendering on the initial animation drawing data in the animation drawing data interval is read from cache.

In the foregoing embodiment, pre-rendering is performed on animation drawing data of a vector graph, and then animation rendering data obtained through rendering is cached. When in response to determining that a to-be-played frame is a vector graph animation frame in the playback process, animation rendering data corresponding to the to-be-played frame is read from cache, reducing a time consumed by converting the animation drawing data into the animation rendering data, thereby effectively reducing a time in the rendering process, which facilitates in improving the fluency of playback of the animation.

Figure 10:
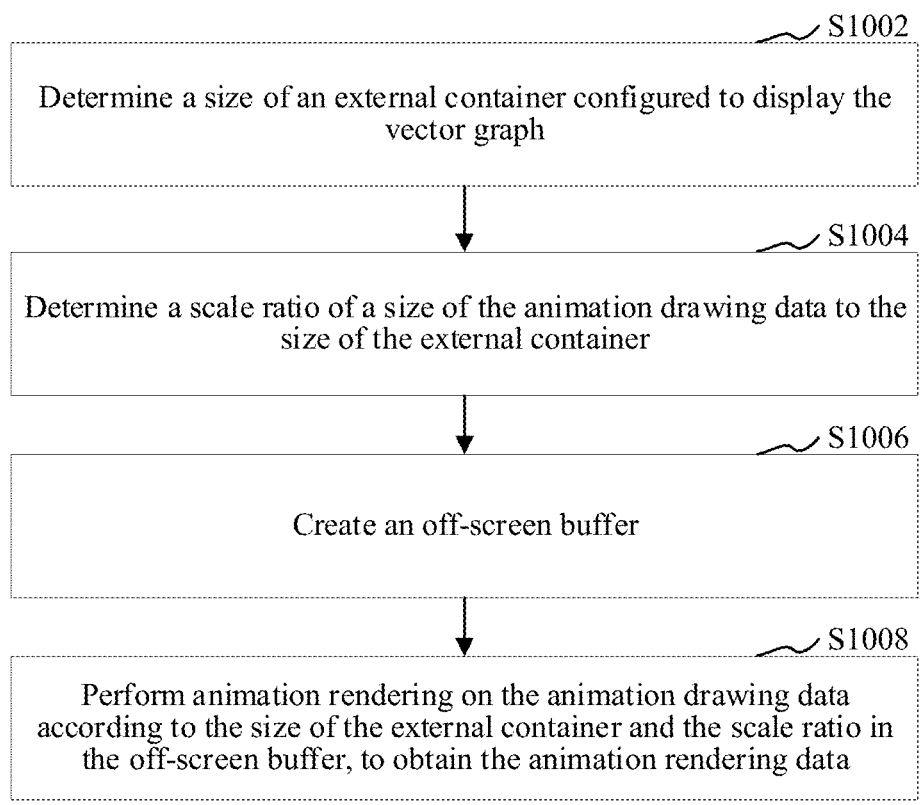
FIG. 10 is a schematic flowchart of a step of off-screen rendering according to one or more embodiments of the present disclosure.

In an embodiment, as shown in FIG. 10, S904 may include the following steps.

S1002. Determine a size of an external container configured to display the vector graph.

The external container may be an external container view configured for displaying the vector graph. For example, when an animation is played on a mobile phone, an image container corresponding to a region in which a vector graph is displayed on the mobile phone may be referred to as an external container.

An actually displayed size of the vector graph depends on a size of the external container because a size of the animation rendering data has been determined during caching of the animation rendering data. To ensure the definition of the animation, during caching of the animation rendering data, a size of the animation rendering data may be applied by using a maximum scale ratio, so that when the cached animation rendering data is applied to a relatively small scenario, the animation rendering data may be compressed rather than stretched, thereby effectively ensuring the definition of the animation.

In an embodiment, in a design process, it is designed that the terminal may preset, according to sizes of the animation in different terminals, sizes of the external container configured to display the vector graph. When the animation is played, the terminal may determine, according to a size of the terminal, a corresponding size of the external container configured to display the vector graph from the preset sizes.

S1004. Determine a scale ratio of a size of the animation drawing data to the size of the external container.

In an embodiment, S1004 may include: determining a first size ratio between an internal container carrying animation frames and the external container; determining a second size ratio between the animation layer and the internal container; determining a third size ratio between animation drawing data in a drawable element attribute group and the animation layer; and determining the scale ratio according to the first size ratio, the second size ratio, and the third size ratio.

For example, for calculation of the scale ratio, the terminal first obtains a first size ratio S1 between an internal container carrying animation frames and the external container; then traverses each layer, and obtains a second size ratio S2 between the layer and the internal container; further traverses each child node in a tree structure until content is found, and obtains an original width and height of the content node and a third size ratio S3 between the content node and the layer node; finally calculates a scale ratio between content and the external container by multiplying S1, S2, and S3. The node tree is composed of the external container, the internal container, the animation layer, the drawable element attribute group, and the animation drawing data in the drawable element attribute group.

In an embodiment, the changed scale ratio is obtained when in response to determining that ratios corresponding to nodes in a node tree have changed, the node tree being composed of the external container, the internal container, the animation layer, the drawable element attribute group, and the animation drawing data in the drawable element attribute group. The size of the cached animation rendering data is adjusted according to the scale ratio. Alternatively, an inputted scale ratio is obtained, and the size of the cached animation rendering data is adjusted according to the inputted scale ratio.

For example, when the animation is played, the terminal places a PAG view (PAGView) for displaying the animation on another leaf node, such as a leaf node at the end of the tree structure. When sizes of these parent nodes change, PAGView is notified, and the scale ratio is applied to the cached animation rendering data. In this way, it may be ensured that the cached animation rendering data is optimal while ensuring the definition of the animation.

In addition, if use of maximum scale ratio still occupies a relatively large amount of internal memory, and the definition of the animation can be still ensured and the animation effect is not affected when the cached animation rendering data is further compressed, another scale ratio may be set on the basis of the maximum scale ratio, to reduce the amount of occupied cache.

S1006. Create an off-screen buffer.

S1008. Perform animation rendering on the animation drawing data according to the size of the external container and the scale ratio in the off-screen buffer, to obtain the animation rendering data.

In an embodiment, to make display of a display synchronize with an animation controller, when an electron gun is ready to scan a new row, the terminal transmits a level synchronization signal, and a refresh frequency of the display is a frequency at which the synchronization signal is generated. Then, the processor calculates parameter values such as animation frames and a width and height of the animation, and transmits the calculated parameter values to a graphics processing unit, to obtain animation rendering data through rendering. The animation rendering data obtained by the graphics processing unit by performing rendering is inputted into an off-screen buffer. Finally, the animation controller read the animation rendering data in the off-screen buffer according to the synchronization signal row by row, and transmits the animation rendering data to the display after digital-to-analog conversion for display.

A context environment may need to be switched in the entire process of off-screen rendering. First a current screen (On-Screen) is switched to Off-Screen. After off-screen rendering ends, the animation rendering data in the off-screen buffer is displayed on the screen, and the terminal may need to switch the context environment from Off-Screen to the current screen.

In the foregoing embodiment, pre-rendering is performed on animation drawing data of a vector graph, to reduce a time consumed when the animation drawing data may need to be converted into the animation rendering data during playback, thereby effectively reducing a time in the rendering process, which facilitates in improving the fluency of playback of the animation.

Figure 11:
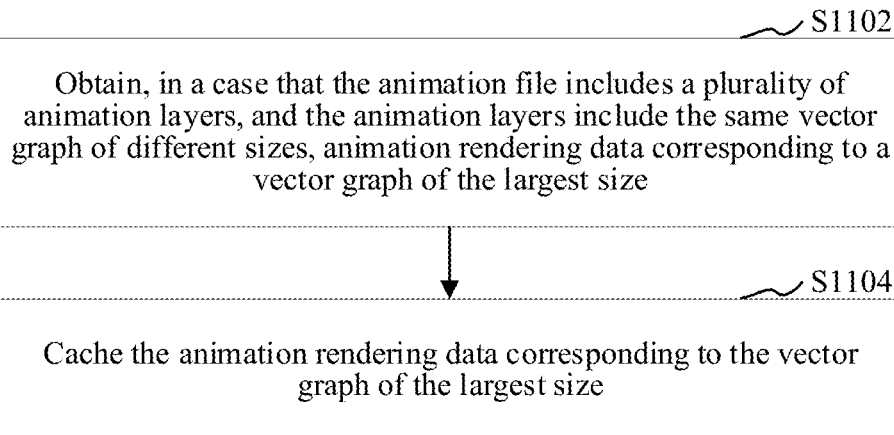
FIG. 11 is a schematic flowchart of a step of storing animation rendering data of a vector graph of the largest size when in response to determining that a plurality of animation layers include the same vector graph according to one or more embodiments of the present disclosure.

In an embodiment, as shown in FIG. 11, the method further includes the following steps.

S1102. Obtain, when in response to determining that the animation file includes a plurality of animation layers, and the animation layers include the same vector graph of different sizes, animation rendering data corresponding to a vector graph of the largest size.

In an embodiment, when in response to determining that the animation file includes a pre-composed attribute group, the pre-composed attribute group synthesizes a plurality of animation layers, and the animation layers include the same vector graph of different sizes, the terminal obtains animation rendering data corresponding to a vector graph of the largest size.

S906 may include: S1104. Cache the animation rendering data corresponding to the vector graph of the largest size.

For example, one animation has three animation layers, and the same image appears in each animation layer. Because all the three animation layers include the same image, only one piece of animation rendering data may need to be cached. However, for a size of the animation rendering data, a scaling status of each animation layer may need to be considered. A maximum scale ratio is selected, so that the size of the cached animation rendering data is the maximum scale ratio during caching. When the animation rendering data is drawn in a relatively small container or layer, the cached animation rendering data may be compressed, ensuring the definition.

In the foregoing embodiment, when in response to determining that the same vector graph appears in a plurality of layers, animation rendering data corresponding to a vector graph of the largest size is cached. On one hand, simultaneous caching of three pieces of animation rendering data may be avoided, thereby reducing the amount of occupied cache. On the other hand, caching the animation rendering data of the largest size avoids a problem of reduction of image definition caused by stretching the vector graph during display.

Figure 12:
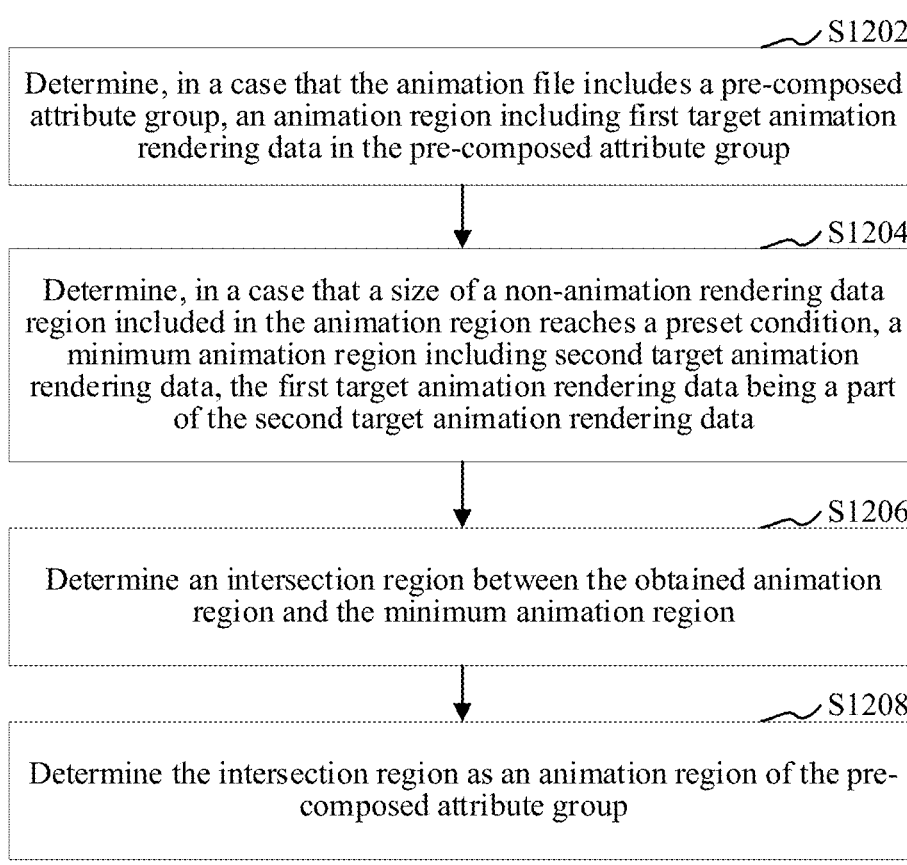
FIG. 12 is a schematic flowchart of a step of calculating an animation region of a pre-composed attribute group according to one or more embodiments of the present disclosure.

In an embodiment, as shown in FIG. 12, S906 may include the following steps.

S1202. Determine, when in response to determining that the animation file includes a pre-composed attribute group, an animation region including first target animation rendering data in the pre-composed attribute group.

Figure 13:
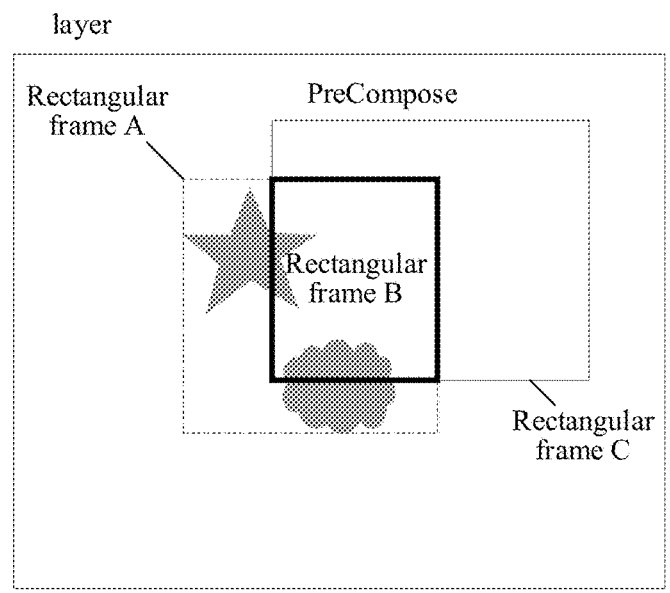
FIG. 13 is a schematic diagram of an animation region of a pre-composed attribute group according to one or more embodiments of the present disclosure.

The first target animation rendering data is a part of the animation rendering data. For example, as shown in FIG. 13, the first target animation rendering data is a part of data in the pentagram and the cloud.

The animation rendering data may be understood as image texture and has a size. Therefore, content included in the animation region may be a part of the animation rendering data. When in response to determining that a size of a non-animation rendering data region in the animation region is relatively large, to avoid that additional calculation may be required during rendering, the animation region may need to be optimized.

S1204. Determine, when in response to determining that a size of a non-animation rendering data region included in the animation region reaches a preset condition, a minimum animation region including second target animation rendering data, the first target animation rendering data being a part of the second target animation rendering data.

The second target animation rendering data includes all the animation rendering data, that is, the first target animation rendering data is a part of the second target animation rendering data. The non-animation rendering data region may be a blank region or an invalid region.

Because the second target animation rendering data includes all the animation rendering data, the second target animation rendering data may be framed by using a rectangular frame, and the rectangular frame is a minimum rectangular frame for framing the second target animation rendering data. The minimum rectangular frame is used as a minimum animation region, as shown in the dashed-line region in FIG. 13.

S1206. Determine an intersection region between the obtained animation region and the minimum animation region.

S1208. Determine the intersection region as an animation region of the pre-composed attribute group.

In an embodiment, when an intersection region between the animation region and the minimum animation region is determined, the terminal uses the intersection region as an animation region of the pre-composed attribute group for display.

In an example, when the animation region of the pre-composed attribute group includes an excessively large invalid region or blank region, the terminal optimizes edges of the pre-composed attribute group. That is, the terminal obtains, through calculation, a minimum rectangular region including all the animation rendering data, and then determines an intersection between the rectangle and a rectangle formed by the edges of the pre-composed attribute group, to obtain actual edges of the pre-composed attribute group.

As shown in FIG. 13, the animation file only includes one layer A and one pre-composed attribute group. Edges of the pre-composed attribute group form a black thin line rectangular frame C, and actual content regions are parts of the pentagram and the cloud. Other parts of the pentagram and the cloud are located outside the rectangular frame. During rendering, because the rectangular frame is mostly blank, optimization may be performed. The optimization process may include: first calculating a minimum rectangle including actual content regions, to obtain a dashed-line rectangular frame A in the figure; and finally resolving an intersection between the dashed-line rectangular frame A and a rectangular frame (that is, a black thin line rectangular frame C) formed by edges of the pre-composed attribute group, to obtain a black thick line rectangular frame B. The black thick line rectangular frame B is an actual animation region that may need to be rendered and displayed.

In the foregoing embodiment, when the animation region of the pre-composed animation attribute group includes a relatively large invalid region, the animation region may need to be re-determined, to ensure that the animation rendering data is included in the animation region, and the invalid region is reduced as much as possible. Therefore, it may be avoided that additional calculation may be required during rendering and the invalid region is scanned during transmission to a screen, thereby reducing a time consumed during transmission to a screen.

In an example, in a comparative animation rendering solution, for example, Lottie animation rendering, all information about a Lottie animation is stored in a JavaScript object notation (JSON) format. In a process of playing the animation, an animation file is first loaded into an internal memory, then the animation file is parsed according to the JSON format, instantaneous animation information is obtained when a playback moment is positioned during playback, that is, content that may need to be displayed by the instantaneous animation is found from the parsed JSON file, which may be an image, text, or the like, and finally, the instantaneous content that is to be displayed may need to be converted into rendering data that can be drawn and transmitted to a screen. In the rendering process, for a vector graph, each piece of point information on path information may need to be calculated, and a path may need to be drawn. However, text is obtained by reading paint information and path information and performing conversion.

In the comparative animation rendering solution, for the same animation, data of the same animation file in the internal memory is not reused. If a plurality of same animations are simultaneously played on a screen, the same animation file is loaded many times. In addition, a piece of instantaneous data of the animation is parsed, and then converted into to-be-drawn data, but a stationary interval of the drawing data is not considered. Therefore, initial drawing data in the stationary interval is not reused when the data in the internal memory is converted into the drawing data. Finally, a time consumed by converting the drawing data of the vector graph into the rendering data is also not considered in the solution. For a complex vector graph, every time the drawing data is converted into the rendering data, a relatively long time may need to be consumed during rendering.

In views of the foregoing problems, an embodiment of the present disclosure provides an animation rendering solution that has three levels of caching. The solution includes animation file caching, drawing data caching, and rendering data caching. Next, the three types of caching manners are illustrated as follows.

1. Animation File Caching

An animation file is decoded and cached in an internal memory. For the same animation file, only one file object obtained after decoding is stored. When the animation may need to be played in a plurality of scenarios, the file object is reused, and the animation file is not read again, avoiding a process of performing decoding many times. In this way, a lot of unnecessary overheads are saved, particularly, overheads in the internal memory. For example, after a client is started up, there is a general loading animation, and the loading animation is used in all loading application scenarios. Therefore, the animation file is loaded in every loading. Although description data of the animation file occupies a relatively small amount of internal memory, when dozens of animations may need the loading animation, overheads occupied by the internal memory are quite heavy.

In addition, a time consumed by decoding may be further reduced. For a plurality of same loading animations, the animation file is decoded only once, consuming a relatively short time, and avoiding an additional time consumed by decoding the animation file into the internal memory for each animation.

2. Drawing Data Caching

An animation stationary interval is obtained through division by using characteristics of a PAG animation, and drawing data caching is performed on the stationary interval. Before drawing data caching is described, division of the stationary interval is first illustrated, which may be as follows.

(1) Division of Stationary Interval

The so-called stationary interval is intuitively understood as follows. For example, a total duration of a PAG animation is 2 s, and it is assumed that there are 24 frames per second. If there is no change in a time period from is to 1.5 s, that is, from is to 1.5 s, the animation is stationary, a stationary interval of the animation is [24,36] with a unit of frame.

Each animation frame in an animation file may be superposed by a plurality of layers, the layer is formed by smaller groups, and the group is described by using a series of attributes, including a time axis attribute and a fixed attribute. For the time axis attribute, an interval of a Hold type may be found, that is, a stationary interval of a time axis attribute. For the fixed attribute, the entire time period is a stationary interval. After a stationary interval of a time axis attribute is found, upward bubbling is performed. When in response to determining that one group includes several time axis attributes, and there is an intersection between stationary intervals of the time axis attributes, a corresponding attribute value of the group in the intersection does not change. Therefore, the intersection is a stationary interval of the group. Similarly, upward bubbling continues to be performed, and an intersection between stationary intervals of a plurality of groups may be found. The intersection is a stationary interval of a layer. An intersection between stationary intervals of a plurality of layers is a stationary interval composed of vectors. In this way, a stationary interval of the entire animation may be obtained.

Figure 14:
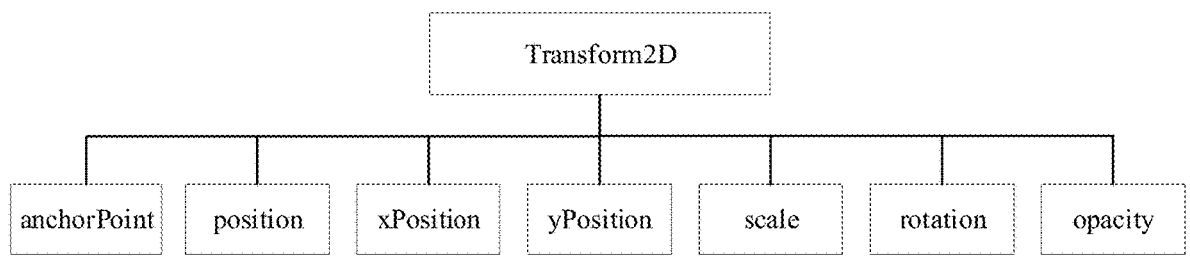
FIG. 14 is a schematic structural diagram of Transform2D according to one or more embodiments of the present disclosure.
Figure 15:
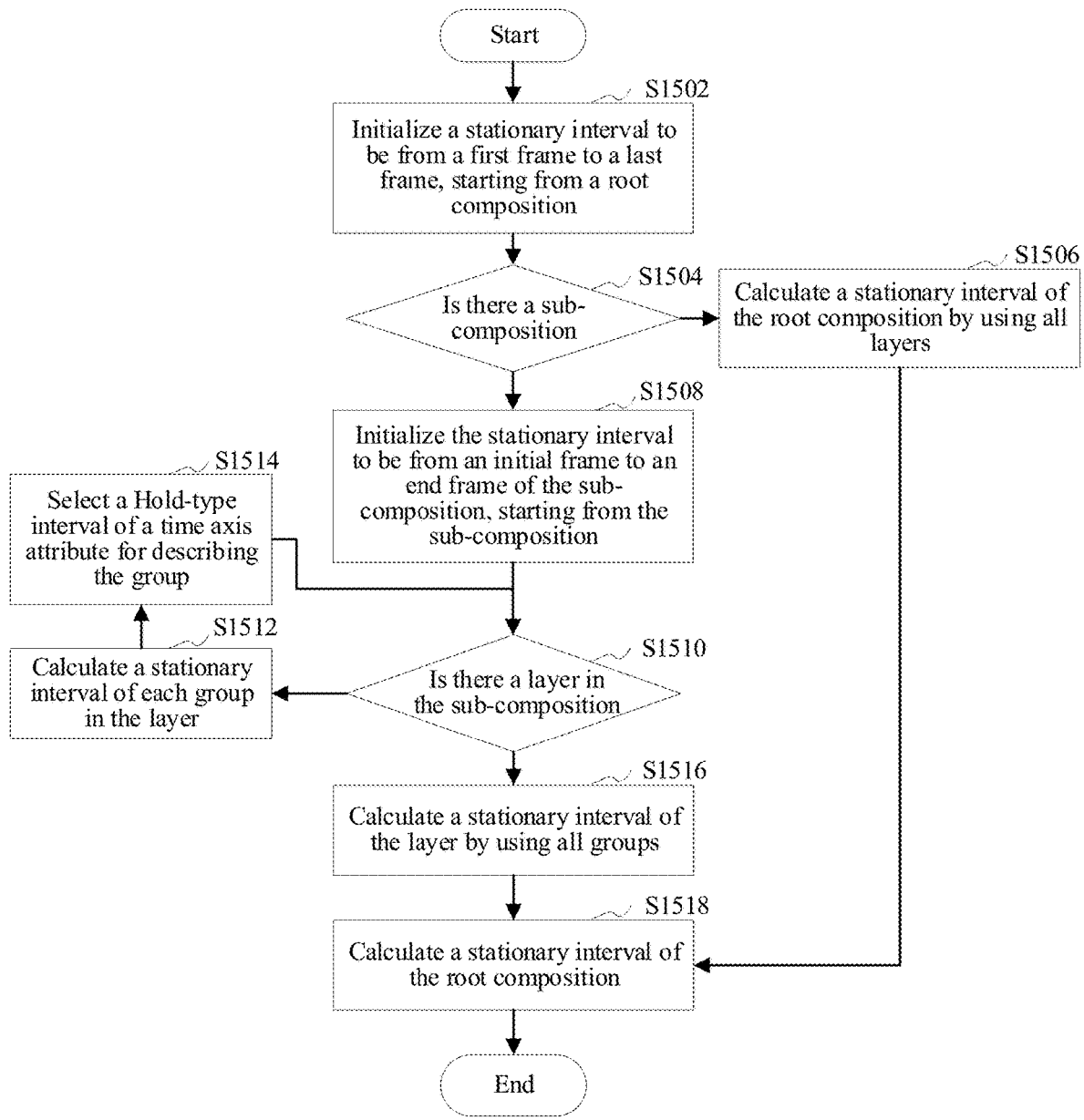
FIG. 15 is a schematic flowchart of a method for dividing a stationary interval according to one or more embodiments of the present disclosure.

Groups forming a layer are classified into six types: transform, mask, trackMatter, layerStyle, effect, and content. Taking transform as an example, transform is formed by a plurality of key frames (Keyframe)<Transform2D>, and each Keyframe is a record of changing information about translation, scaling, rotation, and/or opacity of a layer. transform is stored in a PAG animation file. When the PAG animation file is parsed, these Keyframes are obtained. In this way, an animation trajectory of the layer may be restored. These key frames are eventually stored in a data structure of Transform2D. Transform2D is actually described by using a time axis attribute, which includes the following attributes: anchorPoint, position, xPosition, yPosition, scale, rotation, and opacity, as shown in FIG. 14. position, xPosition, and yPosition describe translation information; anchorPoint and scale describe scaling information; anchorPoint and rotation describe rotation information; and opacity describes opacity information.

When the PAG animation file is parsed, if a group type of a layer is transform, an attribute value of a time axis attribute of description information Transform2D do not change in several Keyframes, it may be understood that the several frames form a stationary interval of this transform. Determining whether an interval is a stationary interval may finally be converted into searching a Hold-type interval of a time axis attribute. This is similar in other groups. When a stationary interval of a parent node layer of a group is resolved, an intersection between stationary intervals of all groups in this layer is calculated.

The stationary interval may be directly calculated, or may be obtained in a manner of searching for a non-stationary interval. That is, when a non-stationary interval is found, a stationary interval of the entire animation may be obtained by filtering out the found non-stationary interval. The manner of obtaining a stationary interval by searching for a non-stationary interval may include the following steps: first, starting from root composition, the entire animation including n frames, and an interval from the first frame to the last frame of the animation is [1,n]; and next, sequentially traversing all layers of sub-compositions, and then each group of the layer is traversed, to remove a non-stationary interval in the group from [1,n]. In this way, [1,n] is divided into a plurality of small intervals. A stationary interval of a layer is an intersection between stationary intervals of all groups in the layer. Similarly, an intersection between stationary intervals of all layers is a stationary interval of compositions. In this way, bubbling is performed layer by layer, to finally obtain a stationary interval of a root composition (that is, the entire animation).

As shown in FIG. 5, FIG. 5 is a schematic diagram of determining an intersection of stationary intervals. t1, t2, m1, m2, c1, c2, c3, and c4 uses a frame as a unit. For a layer in composition, three groups of the layer in the entire animation period are shown in FIG. 5. In an interval of [t1,t2], the layer does not have any transformation such as translation, scaling, and rotation. In an interval of [m1,m2], the layer uses the same mask, and there is no change in the mask. In intervals of [c1,c2] and [c3,c4], the layer respectively applies a piece of text and an image, and there is no change in the text and the image.

Apparently, for the content group, both [c1,c2] and [c3,c4] are stationary intervals of the content. During animation rendering, text at a c1 moment may only need to be parsed once, an image at a c3 moment is parsed once, and the text and image are stored in the internal memory and are marked. When a frame that may need to be drawn is c during playback of the animation, and c is in the interval of [c1,c2], text of the frame c does not need to be parsed again, and a marked cache may be found directly by using c1, to draw text of c1. This text is exactly the same as the text of the frame c.

Only a scenario of the content group is considered above. For a layer, the layer includes a plurality of groups, and a stationary interval of the layer is an intersection between stationary intervals of all the groups in the layer. As shown in FIG. 5, if a layer only includes three groups, the layer has two stationary intervals: [m1,c2] and [c3,t2].

It may be seen that division of the stationary interval is actually a bubble process. First, Hold-type intervals of a time axis attribute are searched for, an intersection is determined to find a stationary interval of a group, and then determination of the intersection is performed upward layer by layer, until a stationary interval of a root composition, that is, a stationary interval of the entire animation, is obtained.

In conclusion, the procedure of division of the stationary interval is described as follows.

S1502. Initialize a stationary interval to be from a first frame to a last frame, starting from a root composition.

S1504. Determine whether there is a sub-composition.

S1506. Calculate, when in response to determining that there is no sub-composition, a stationary interval of the root composition by using all layers, and then perform S1518.

S1508. Initialize, when in response to determining that there is a sub-composition, the stationary interval to be from an initial frame to an end frame of the sub-composition, starting from the sub-composition.

S1510. Determine whether there is a layer in the sub-composition.

S1512. Calculate, when in response to determining that there is a layer in the sub-composition, a stationary interval of each group in the layer.

S1514. Select a Hold-type interval of a time axis attribute for describing the group, and then determine whether there is a layer in the sub-composition.

S1516. Calculate, when in response to determining that there is no layer in the sub-composition, a stationary interval of the layer by using all groups.

S1518. Calculate a stationary interval of the root composition.

(2) Drawing Data Caching

Drawing data caching refers to caching a part related to a PAG file (PAGFile) object. After a PAGFile object is obtained through decoding, all stationary intervals may be obtained by using the foregoing method for dividing the stationary interval. In addition, initial animation drawing data of a stationary interval may be obtained by parsing the PAGFile object, and then the initial animation drawing data is cached. To reduce a size of cache as much as possible, only necessary drawing data is cached. Different caching policies are used for different layers, different groups, and smaller-granularity classification.

In the PAG animation, when an animation frame is drawn, the frame is jumped to, and then each layer or a pre-composed composition is sequentially drawn. The pre-composed composition is essentially embedding of a plurality of layers of compositions. Finally, the process still may need to draw layers. Therefore, a granularity of drawing may be further subdivided to drawing of a specific layer. A layer may include any one or more of the six types of groups. A caching policy of each type of group is sequentially described as follows.

1) Content

Content is an indispensable part of a layer, which indicates a drawable element part of the layer, such as image, text, and shape. Other groups are obtained by performing processing, such as translation and scaling, adding a mask, and adding a filter effect, based on content.

Elements that may be indicated by Content may be substantially classified into: shape, text, solid, PreCompose and image. Due to diversity of Content, specific elements may need to be cached. For the five elements, different data content is respectively cached.

Shape indicates a shape, which may be a common circle, a rectangle, a pentagram, and the like, or may be a shape without any rule. During image rendering, for description of the shape, only path information and paint information may need to be drawn, an indicated graphic may be completely drawn by only drawing path information and paint information. A customized data structure is cached for shape herein. content of the customized data structure is shape painting (ShapePaint). ShapePaint includes two attribute values, that is, drawn path information and paint information.

Text indicates text content, that is, text. For example, a row of prompt words in an animation is played in a scrolling manner. The prompt words use text. Information required in text rendering is similar to that required in shape, that is, both the path information and the paint information are required. In addition, the text may set a font type. For example, a font in an animation may be in different types. Therefore, an attribute value of font type information further may need to be recorded.

Solid is a special example of shape, which may indicate a solid rectangle filled with a color. A width, a height, and a fill color of the rectangle may be used for describing solid, that is, three types of attribute values, that is, width, height, and fill color, may be cached. There are many application scenarios of solid, such as a graphic in a simple vector animation, a mask used as a layer, or a pre-composed mask.

Image indicates an image. During rendering, specific pixel information of the image may need to be obtained. Therefore, the pixel information of the image is used as an attribute value and is cached. In addition, for a displayed size of an image, a width and a height of the image changes especially during scaling. Therefore, corresponding compression and stretching may need to be performed during rendering. Therefore, the original width and height of the image may also need to be cached as attribute values.

PreCompose represents pre-composition, which is formed by one or more layers; or another composition may be further embedded. In this embodiment, PreCompose is used for sub-composition application. For caching of PreCompose, layers included in PreCompose are traversed, and then caching is performed by using a layer-level caching policy.

2) Transform

Actually, an animation may change with a time axis, and most of changes are formed by at least one of translation, scaling, rotation, or fade-in and fade-out.

In a 2D space, transform is performed on a rectangle. If it is a translated animation, an initial position (recording x and y coordinates) of the rectangle may be determined, and then x-axis and y-axis translation distances, namely, xPosition and yPosition (quantities of floating points for recording distances), are recorded. The translated animation may be restored by using the three pieces of information: an x coordinate, a y coordinate, and a distance. If it is a scaled animation, an anchorPoint may be first determined, and scale information is further added. In this way, the scaled animation may be completely restored. If it is a rotated animation, an anchorPoint may be first determined, and rotation information is further added. In this way, the rotated animation may be restored. If it is a fade-in and fade-out opacity animation, opacity information may be recorded.

In conclusion, any change in the 2D space may be recorded by using a small amount of information. Information recorded for translation, scaling, and rotation may be recorded by using Matrix, and a change in opacity may be recorded by using opacity. By recording the two pieces of information, a change in the animation may be restored. Therefore, during caching, only Matrix and opacity may need to be cached as attribute values.

3) Mask

A mask is implemented by combining two simple graphics into a new graphic. Mask herein indicates a mask in a layer. During rendering, the mask is drawn by using path information and a mask mode. For example, for a rectangular mask, essentially, path information of this rectangle, that is, vertex information of the rectangle, may need to recorded, so as to restore this mask rectangle. Therefore, the path information and the mask mode may need to be cached.

The mask mode determines final display. For example, an Add mode indicates that directly adding the mask for display; a Subtract mode indicates subtracting a portion covered by the mask; an Intersect mode indicates acquiring an intersection portion of the original graphic and the mask for display; and a Difference mode indicates acquiring a disjoint portion between the original graphic and the mask for display.

4) TrackMatter

TrackMatter is similar to Mask, which also functions as a mask. A difference between TrackMatter and Mask lies in that Mask is a mask in a layer, but TrackMatter is obtained by using a layer as a mask of another layer according to opacity and brightness. For TrackMatter, content that may need to be cached is also path information and mode information.

The mode of TrackMatter includes the following types: an Alpha mode, in which a display region is controlled according to an opacity region of a layer; an AlphaInverted mode, in which a display region of a layer is controlled according to a transparent region of the layer; and a Luma mode and a LumaInverted mode, which are similar to the Alpha mode, and a difference between them lies in that in the Luma mode and LumaInverted mode, a condition used for controlling the display region is changed to brightness.

5) layerStyle and Effect layerStyle and effect are a type of filter. The filter may be understood as a personalized effect generated by processing pixels of an image. In a PAG animation, layerStyle and effect may be used for supporting a projection effect, which relies on filter information during implementation. For example, a projection image is further drawn on the original image, where parameters of the image are calculated by using a color, a direction, and a distance of projection. Therefore, during caching, filter information may be cached.

3. Rendering Data Caching

For a vector graph, drawing data caching may ensure that a piece of instantaneous data of an animation may be directly obtained. However, calculation may further be needed to convert the drawing data into rendering data that may be directly drawn. Particularly, for a vector graph with complex path information, point coordinates of the path information and path description information between points may need to be parsed one by one during rendering, to draw the path information into a vector graph. This is also the case for drawing data of text. Only path information and paint information of the text in the drawing data are cached. Every time these pieces of information are drawn, calculation and conversion may consume a time. The time may be reduced in a manner of rendering data caching, which may be: creating an off-screen buffer after drawing data is obtained, then performing off-screen rendering, to obtain rendering data, caching the rendering data, and directly reading the rendering data from cache when drawing is required. In this way, a time consumed by converting the drawing data into the rendering data is reduced.

Because the vector graph may be scaled, a displayed size of the vector graph depends on a size of an external display container View. When the rendering data is cached, a size of texture is already determined. Therefore, to ensure the definition of the final animation, during caching of the rendering data, a size of the texture may be applied by using a maximum scale ratio. In this way, when the cached rendering data is applied to a relatively small scenario, the rendering data may be compressed rather than stretched, thereby effectively ensuring the definition of the animation. For calculation of the scale ratio, a scale ratio S1 of external View configured for carrying and displaying an animation is first obtained; each composition and layer is then traversed layer by layer, to obtain a scale ratio S2 between them; a scale ratio of each node in a tree structure is further found, until content is found, and an original width and height of the content and a scale ratio S3 between the content and the parent node is obtained; and finally a scale ratio between content and the display View is calculated by multiplying scale ratios in tree-like levels, that is, S1, S2, and S3.

Due to embedding, content of a PreCompose type differs from that of an image type. For example, for an animation including a PreCompose type, the animation includes three layers, and the same image may appear in each layer. However, because the images are the same, only one image may need to be cached. To select a cached size of the image, all scale ratios at positions where the image is used may need to be considered, to select a maximum scale ratio. During caching, a cached size of texture is a scenario of the maximum scale ratio. When the texture is drawn on a relatively small View, the cached image may be directly compressed, to ensure the definition of the image.

Moreover, a setCacheScale (float scale) interface configured to set a size is provided for external setting. When the animation is displayed, PAGView for displaying the animation is usually placed in other containers. When sizes of the parent containers change, PAGView may need to be notified, and the scale ratio is applied to rendering data caching. In this way, it may be ensured that the cached rendering data is optimal while ensuring the definition. In addition, if use of the maximum scale ratio still occupies a large amount of internal memory, and after further compression, the definition of the cached image can be still ensured and the animation effect is not affected, a scale ratio may be further set on the basis of the maximum scale ratio, to reduce the amount of cache.

For optimization of edge measurement of PreCompose, a minimum rectangular region including all content is obtained through calculation, and an intersection between the rectangle and an edge rectangle of PreCompose is resolved, to obtain actual edges of PreCompose. FIG. 13 shows an animation formed by only one layer A and one PreCompose. Edges of PreCompose form a small black thin line rectangular frame, and actual content regions are parts of the pentagram and the cloud, and other parts of the pentagram and the cloud are located outside the rectangular frame. During rendering, because the rectangular frame is mostly blank, optimization may be performed. An optimization manner may include: first calculating a minimum rectangular frame including actual content, to obtain a black dashed-line rectangular frame A in FIG. 13; and finally resolving an intersection between the rectangular frame A and the edges of PreCompose, to obtain a black thick line rectangular frame B. The rectangular frame B is an actual region for displaying the animation.

4. Comparison of Rendering Times

Figure 16:
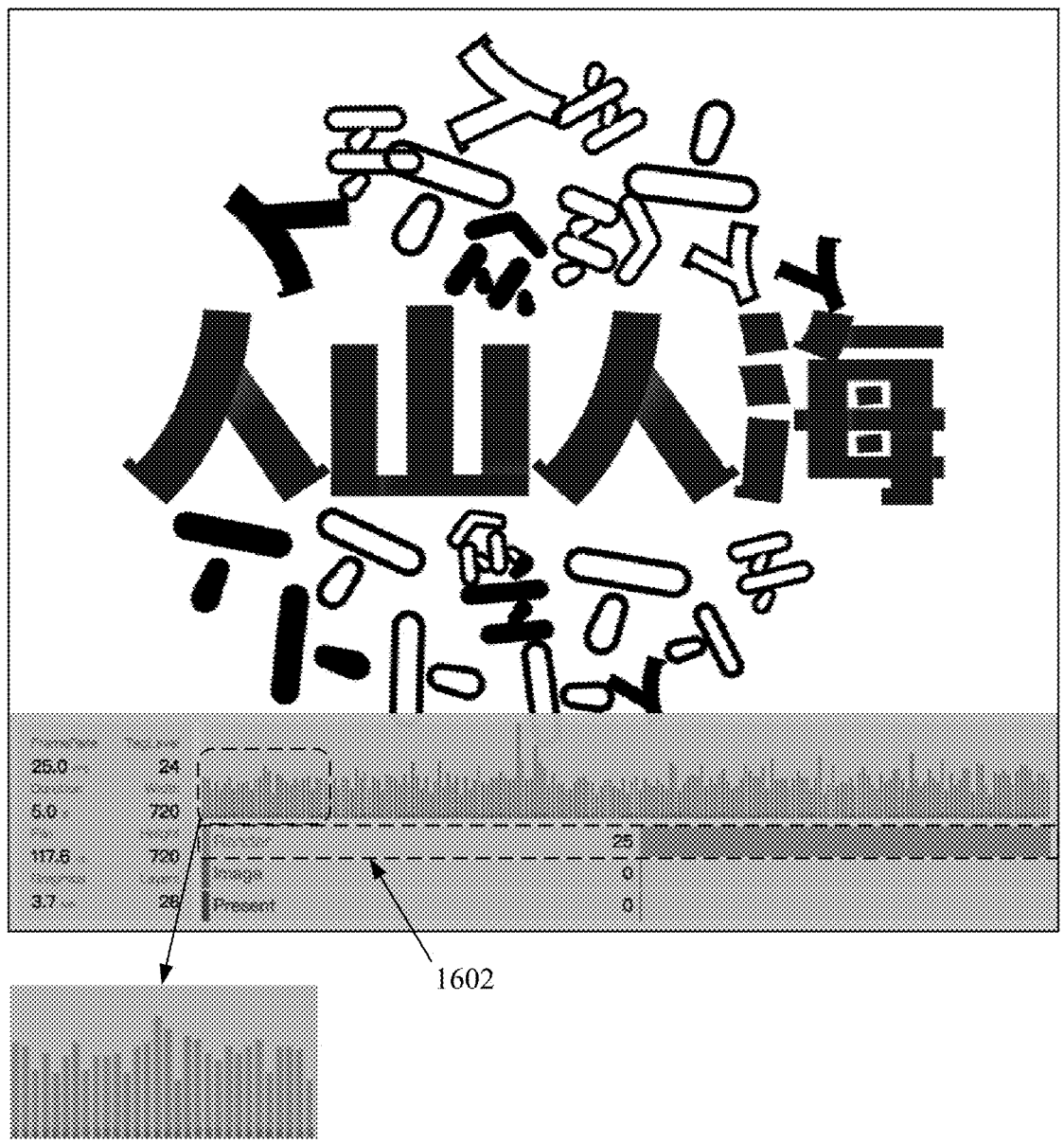
FIG. 16 is a schematic diagram of a rendering time consumed when all caching policies are used according to one or more embodiments of the present disclosure.

For the same PAG animation of "人山人海", an animation previewer (PAGviewer) is used to view a time consumed during rendering. FIG. 16 is a schematic diagram of a rendering time consumed when all caching policies are used, FIG. 17 is a schematic diagram of a rendering time consumed when rendering data caching is not performed, FIG. 18 is a schematic diagram of a rendering time consumed when drawing data caching is not performed, and FIG. 19 is a schematic diagram of a rendering time consumed when no caching policy is used.

Figure 17:
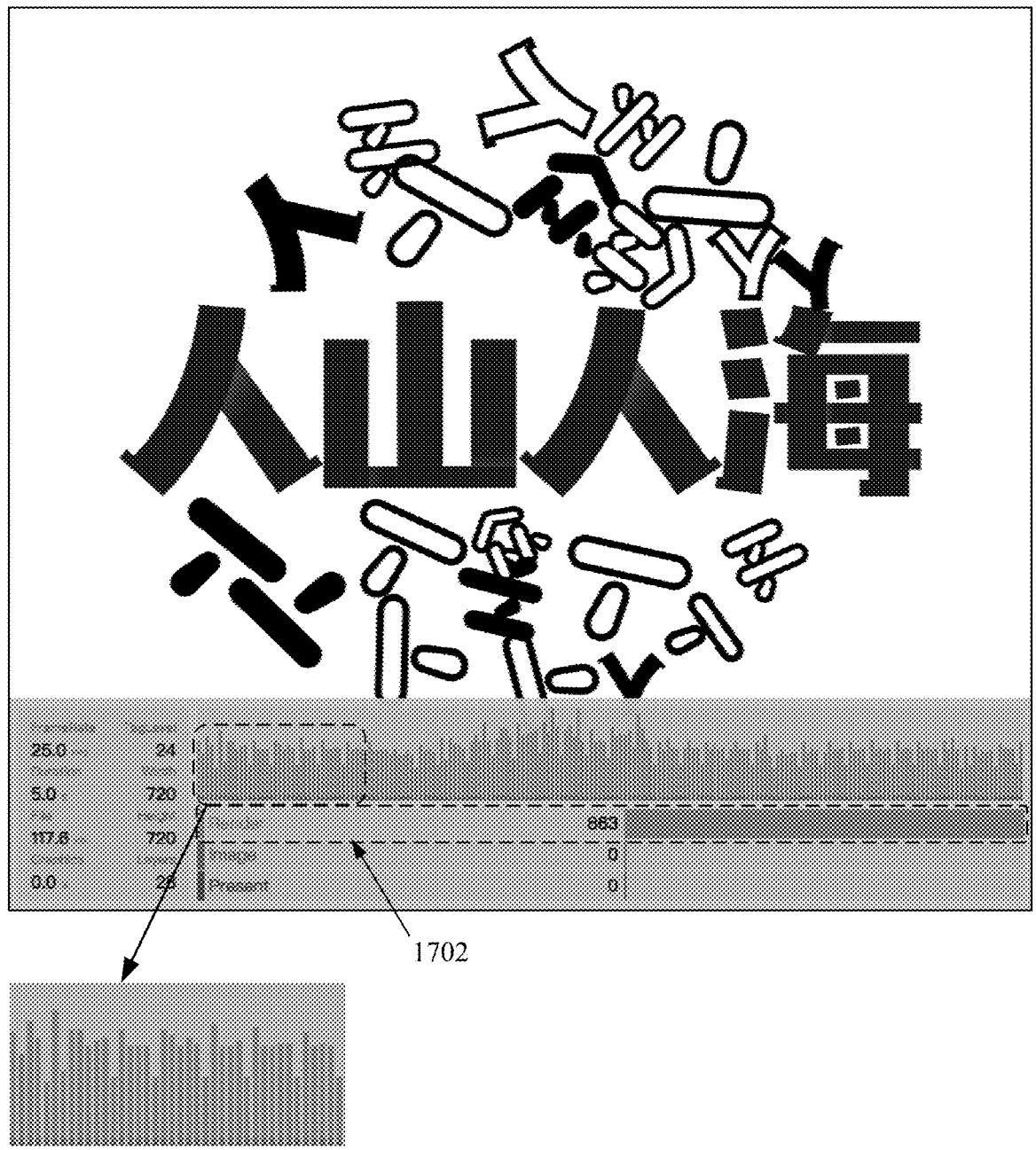
FIG. 17 is a schematic diagram of a rendering time consumed when rendering data caching is not performed according to one or more embodiments of the present disclosure.
Figure 18:
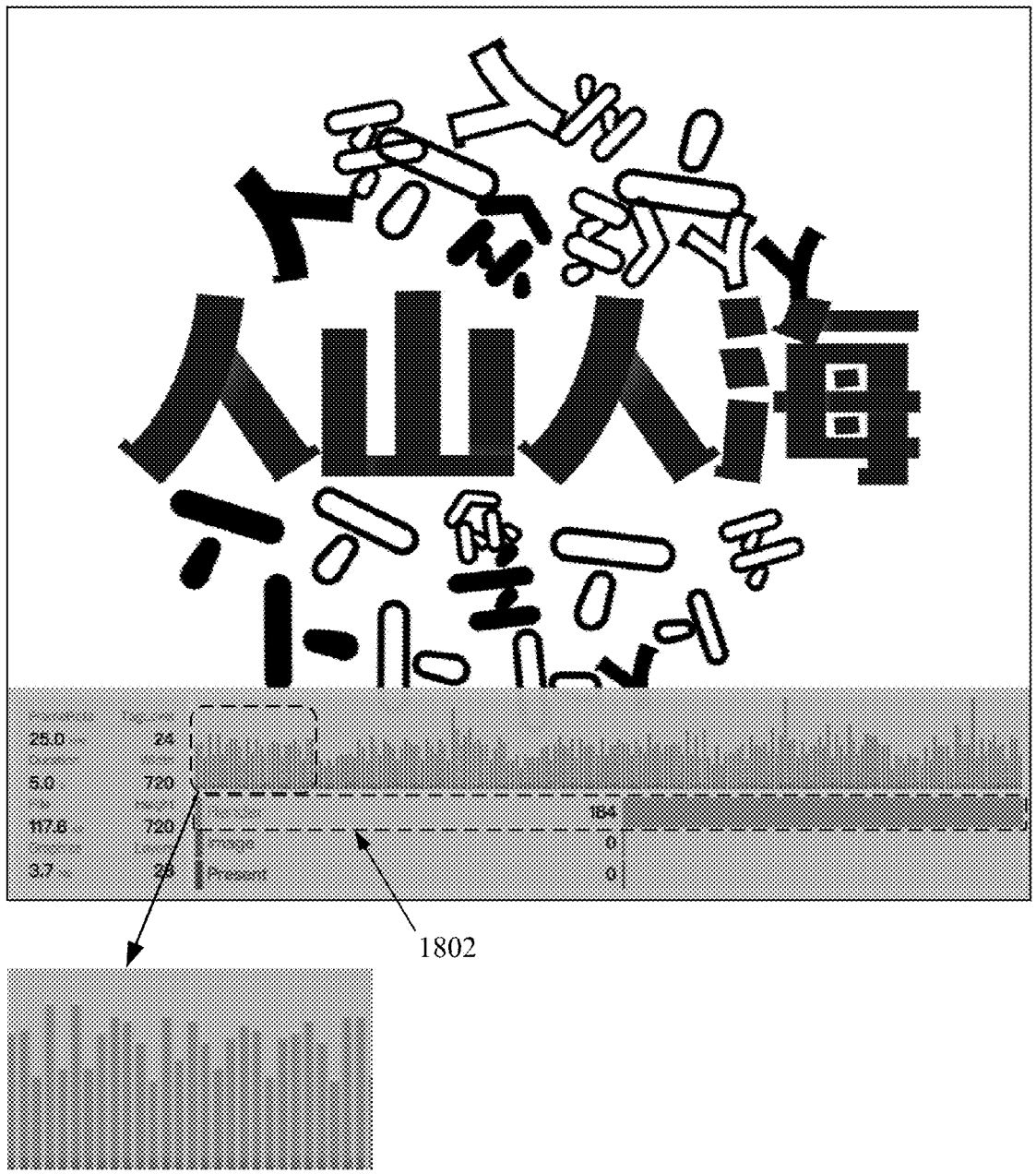
FIG. 18 is a schematic diagram of a rendering time consumed when drawing data caching is not performed according to one or more embodiments of the present disclosure.
Figure 19:
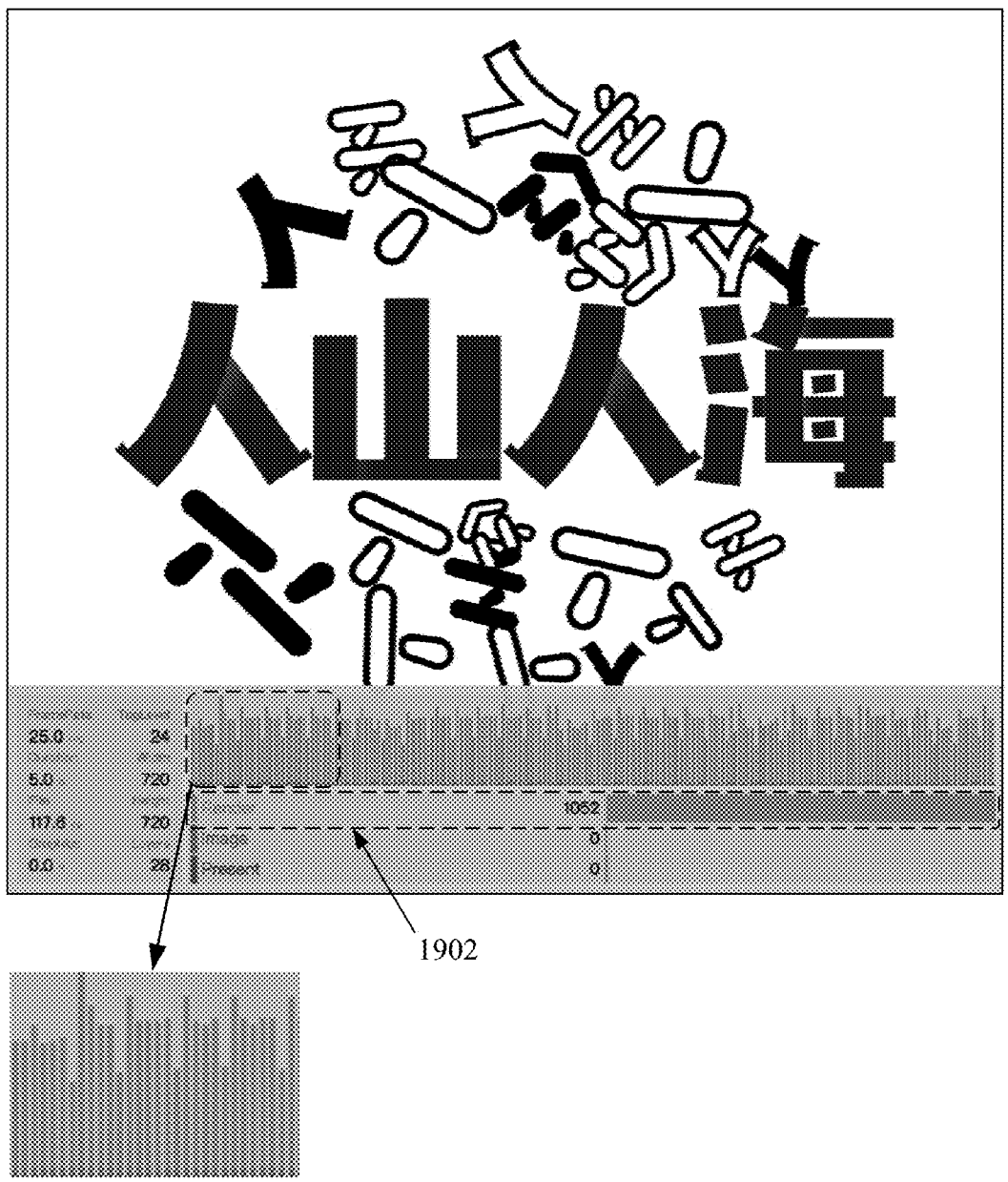
FIG. 19 is a schematic diagram of a rendering time consumed when no caching policy is used according to one or more embodiments of the present disclosure.

It may be obtained from FIG. 16 to FIG. 19 that when all caching policies are used, a minimum rendering time, that is, only 25 ms, is consumed, as shown in a dashed-line box 1602 in FIG. 16; when no caching policy is used, a maximum rendering time, that is, 1052 ms, is consumed, as shown in a dashed-line box 1902 in FIG. 19. It may be learned from the rendering times in FIG. 16 and FIG. 19 that a difference between the rendering time consumed when all caching policies are used and the rendering time consumed when no caching policy is used is two orders of magnitude.

In addition, when rendering data caching is not performed (that is, drawing data caching is performed), a corresponding rendering time is 863 s, as shown in dashed-line box 1702 in FIG. 17; when drawing data caching is not performed (that is, rendering data caching is performed), a corresponding rendering time is 184 s, as shown in dashed-line box 1802 in FIG. 18. There is a difference between rendering times corresponding to drawing data caching and rendering data caching. However, drawing data caching and rendering data caching are two different caching policies, are applicable to different application scenarios, and thus have different functions. The animation of "人山人海" herein embodies a good performance of application of rendering data caching in a complex graphic.

The foregoing embodiment may have the following beneficial effects:

1) A rendering time of an animation may be significantly reduced. Compared with a comparative animation rendering method, one order to two orders of magnitude of rendering time may be reduced by using the animation rendering method in the embodiments of the present disclosure. By reducing the rendering time, the animation may be played smoother, and a relatively good playback effect may also be achieved on a low-end mobile phone. Particularly, when there are a plurality of animations simultaneously played in the same page on a client, if the animations are the same, a decoding time may be greatly reduced.

2) Different caching policies are used in different layers, and different calculation rules are used for an image and a pre-composed composition when a scale ratio of the animation is calculated.

FIG. 2 to FIG. 4, FIG. 6 to FIG. 12, and FIG. 15 are schematic flowcharts of an animation rendering method according to an embodiment. It is to be understood that steps in flowcharts of FIG. 2 to FIG. 4, FIG. 6 to FIG. 12, and FIG. 15 are displayed in sequence based on indication of arrows, but the steps are not necessarily performed in sequence based on a sequence indicated by the arrows. Unless otherwise explicitly specified in the present disclosure, execution of the steps is not strictly limited, and the steps may be performed in other sequences. Moreover, at least some of the steps in FIG. 2 to FIG. 4, FIG. 6 to FIG. 12, and FIG. 15 may include a plurality of sub-steps or a plurality of stages. The sub-steps or stages are not necessarily performed at the same moment, but may be performed at different moments. The sub-steps or stages are not necessarily performed sequentially, but may be performed in turn or alternately with at least some of other steps, sub-steps or stages of other steps.

Figure 20:
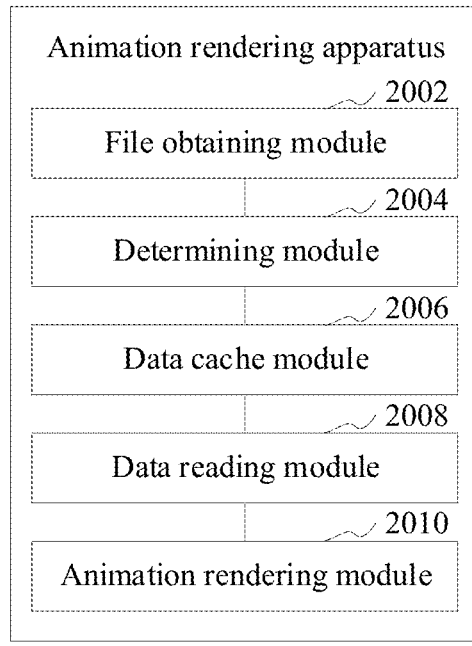
FIG. 20 is a schematic structural block diagram of an animation rendering apparatus according to one or more embodiments of the present disclosure.

As shown in FIG. 20, in an embodiment, an animation rendering apparatus is provided. The apparatus includes: a file obtaining module 2002, a determining module 2004, a data cache module 2006, and a data reading module 2008, and an animation rendering module 2010.

The file obtaining module 2002 is configured to obtain an animation file in a target format.

The determining module 2004 is configured to determine, when or in response to determining that the animation file is decoded, an animation drawing data interval meeting a stationary condition from animation drawing data obtained through decoding.

The data cache module 2006 is configured to cache initial animation drawing data in the animation drawing data interval.

The data reading module 2008 is configured to read, when or in response to determining that animation drawing data corresponding to a to-be-played frame meets the stationary condition in a playback process of the animation file, the cached initial animation drawing data corresponding to the to-be-played frame.

The animation rendering module 2010 is configured to perform animation rendering according to the read initial animation drawing data.

In the foregoing embodiment, the initial animation drawing data of the animation drawing data interval meeting the stationary condition is cached. When a corresponding animation frame whose attribute values meeting the stationary condition is to be displayed, initial animation drawing data corresponding to the to-be-played frame is directly obtained from cache, so that the animation file does not need to be parsed again to obtain the initial animation drawing data corresponding to the to-be-played frame, reducing a calculation amount, and reducing a time consumed in a rendering process, thereby making playback of the animation smoother.

In an embodiment, the determining module 2004 is further configured to: decode the animation file to obtain an animation file object; read animation drawing data in the animation file object; and determine the animation drawing data interval meeting the stationary condition from the read animation drawing data.

In the foregoing embodiment, the animation file is decoded to obtain an animation file object, animation drawing data in the animation file object is read, and then the animation drawing data interval meeting the stationary condition in the animation file object is found, so as to cache initial animation drawing data in the animation drawing data interval. Therefore, when a corresponding animation frame whose attribute values meet the stationary condition is to be played, initial animation drawing data corresponding to the to-be-played frame is directly obtained from cache, reducing a calculation amount, and reducing a time consumed in a rendering process, thereby making playback of the animation smoother.

In an embodiment, the animation file includes at least one animation layer; each animation layer includes at least two animation attribute groups; and each animation attribute group includes at least two animation attribute values. The determining module 2004 is further configured to: determine, when or in response to determining that the animation file is decoded, animation attribute value intervals meeting the stationary condition in the each animation attribute group; use an intersection between the animation attribute value intervals as a group drawing data interval of the each animation attribute group; and determine an intersection between the group drawing data intervals as an animation drawing data interval of the animation layer.

In the foregoing embodiment, animation attribute value intervals meeting a stationary condition are first determined, and then an animation drawing data interval is calculated by using a bubble algorithm, so as to cache initial animation drawing data in the animation drawing data interval. Therefore, when a corresponding animation frame whose attribute values meet the stationary condition is to be played, the initial animation drawing data corresponding to the to-be-played frame is directly obtained from cache, reducing a calculation amount, and reducing a time consumed in a rendering process, thereby making playback of the animation smoother.

Figure 21:
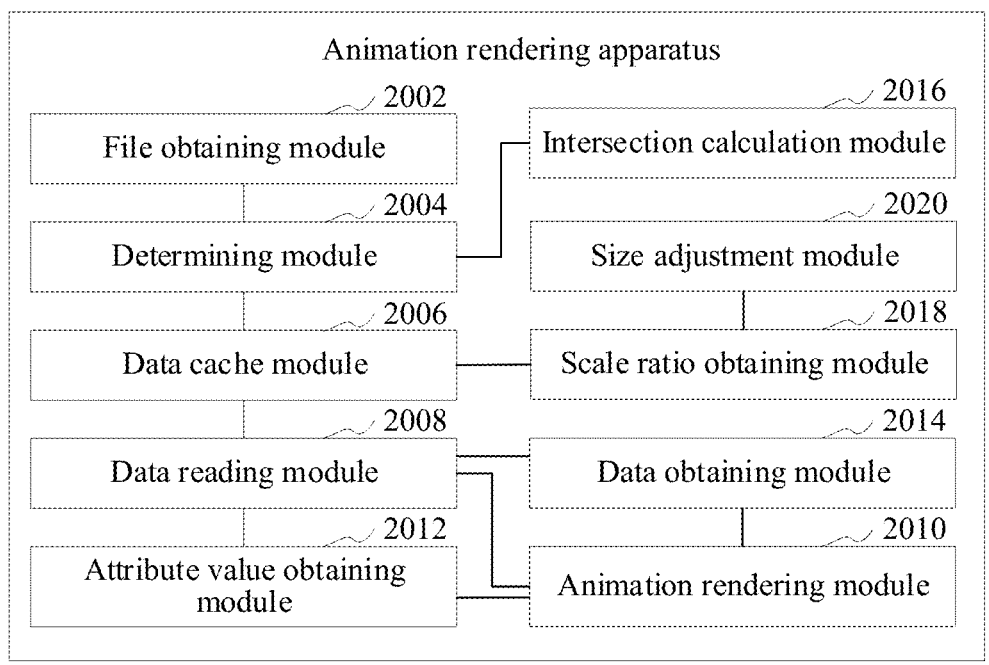
FIG. 21 is a schematic structural block diagram of an animation rendering apparatus according to one or more embodiments of the present disclosure.

In an embodiment, as shown in FIG. 21, the apparatus further includes an attribute value obtaining module 2012.

The data cache module 2006 is further configured to cache initial animation attribute values of the animation attribute value intervals when or in response to determining that there is no intersection between the animation attribute value intervals.

The data reading module 2008 is further configured to read, when or in response to determining that the animation drawing data corresponding to the to-be-played frame does not meet the stationary condition in the playback process of the animation file, and there is no intersection between the animation attribute value intervals, a cached initial animation attribute value corresponding to the to-be-played frame.

The attribute value obtaining module 2012 is configured to obtain animation attribute values that correspond to the to-be-played frame and do not meet the stationary condition from an animation file object obtained by decoding the animation file.

The animation rendering module 2010 is further configured to perform animation rendering according to the read initial animation attribute value and the obtained animation attribute values.

In the foregoing embodiment, when neither the animation layer nor the animation attribute group has a stationary interval, initial animation attribute values of animation attribute values that have stationary intervals are cached. When the to-be-played frame hits a stationary interval of an animation attribute value, an initial animation attribute value corresponding to the to-be-played frame is read from cache, and an animation attribute value in a stationary interval does not need to be obtained through parsing from the animation file object, reducing a calculation amount, and reducing a time consumed in a rendering process, thereby making playback of the animation smoother.

In an embodiment, as shown in FIG. 21, the apparatus further includes a data obtaining module 2014.

The data cache module 2006 is further configured to cache initial group drawing data of the group drawing data intervals when or in response to determining that there is an intersection between the animation attribute value intervals but no intersection between the group drawing data intervals.

The data reading module 2008 is further configured to read, when or in response to determining that the animation drawing data corresponding to the to-be-played frame does not meet the stationary condition in the playback process of the animation file, cached initial group drawing data corresponding to the to-be-played frame.

The data obtaining module 2014 is configured to obtain group drawing data that corresponds to the to-be-played frame and does not meet the stationary condition from an animation file object obtained by decoding the animation file.

The animation rendering module 2010 is further configured to perform animation rendering according to the read initial group drawing data and the obtained group drawing data.

In the foregoing embodiment, when there is no stationary interval in the animation layer, but there is a stationary interval in the animation attribute group, initial group drawing data of group drawing data that has stationary intervals is cached. When the to-be-played frame hits a stationary interval of group drawing data, initial group drawing data corresponding to the to-be-played frame is read from cache, and group drawing data in a stationary interval does not need to be obtained through parsing from the animation file object, reducing a calculation amount, and reducing a time consumed in a rendering process, thereby making playback of the animation smoother.

In an embodiment, when or in response to determining that the animation attribute group is a drawable element attribute group, the animation attribute group includes at least two drawable elements; and each drawable element includes at least two animation attribute values. As shown in FIG. 21, the apparatus further includes an intersection calculation module 2016.

The determining module 2004 is further configured to determine the intersection between the animation attribute value intervals as an element interval of the each drawable element.

The intersection calculation module 2016 is configured to calculate an intersection between the element intervals of the drawable elements.

The determining module 2004 is further configured to determine the intersection between the element intervals as the group drawing data interval of the each animation attribute group.

In an embodiment, when or in response to determining that animation drawing data corresponding to a to-be-played frame meets the stationary condition in a playback process of the animation file, the data reading module 2008 is further configured to: determine, when or in response to determining that the animation file is played in more than one application, a playback progress corresponding to each application; and read, when or in response to determining that animation drawing data of a to-be-played frame corresponding to the playback progress meets the stationary condition, initial animation drawing data that is cached, corresponds to the playback progress, and is shared by the more than one application.

In the foregoing embodiment, when or in response to determining that a plurality of applications in the client plays the same animation, the plurality of applications share animation drawing data obtained by parsing the same animation file, and initial animation drawing data is cached. Therefore, on one hand, a caching space is reduced, and on the other hand, a calculation amount of parsing is reduced. When animation drawing data corresponding to each to-be-played frame meets the stationary condition, initial animation drawing data corresponding to the each to-be-played frame is obtained from cache, and animation drawing data in a stationary interval does not need to be obtained through parsing from the animation file object, reducing a calculation amount, and reducing a time consumed in a rendering process, thereby making playback of the animation smoother.

In an embodiment, the animation file includes a vector graph. The data obtaining module 2014 is further configured to obtain animation drawing data that is about the vector graph and obtained by decoding the animation file.

The animation rendering module 2010 is further configured to perform off-screen rendering on the animation drawing data, to obtain animation rendering data.

The data cache module 2006 is further configured to cache the animation rendering data.

The data reading module 2008 is further configured to read, when or in response to determining that a to-be-played frame is a vector graph animation frame in the playback process of the animation file, cached animation rendering data corresponding to the to-be-played frame.

In an embodiment, the animation rendering module 2010 is further configured to: determine a size of an external container configured to display the vector graph; determine a scale ratio of a size of the animation drawing data to the size of the external container; create an off-screen buffer; and perform animation rendering on the animation drawing data according to the size of the external container and the scale ratio in the off-screen buffer, to obtain the animation rendering data.

In an embodiment, the animation rendering module 2010 is further configured to: determine a first size ratio between an internal container carrying animation frames and the external container; determine a second size ratio between the animation layer and the internal container; determine a third size ratio between animation drawing data in a drawable element attribute group and the animation layer; and determine the scale ratio according to the first size ratio, the second size ratio, and the third size ratio.

In the foregoing embodiment, pre-rendering is performed on animation drawing data of a vector graph, and then animation rendering data obtained through rendering is cached. When or in response to determining that a to-be-played frame is a vector graph animation frame in the playback process, animation rendering data corresponding to the to-be-played frame is read from cache, reducing a time consumed by converting the animation drawing data into the animation rendering data, thereby effectively reducing a time in the rendering process, which facilitates in improving the fluency of playback of the animation.

In an embodiment, as shown in FIG. 21, the apparatus further includes: a scale ratio obtaining module 2018 and a size adjustment module 2020.

The scale ratio obtaining module 2018 is configured to obtain a changed scale ratio when or in response to determining that ratios corresponding to nodes in a node tree have changed, the node tree being composed of the external container, the internal container, the animation layer, the drawable element attribute group, and the animation drawing data in the drawable element attribute group.

The size adjustment module 2020 is configured to adjust the size of the cached animation rendering data according to the scale ratio; or the scale ratio obtaining module 2018 is further configured to obtain an inputted scale ratio, and the size adjustment module 2020 is further configured to adjust the size of the cached animation rendering data according to the inputted scale ratio.

In the foregoing embodiment, pre-rendering is performed on animation drawing data of a vector graph, to reduce a time consumed when the animation drawing data may need to be converted into the animation rendering data during playback, thereby effectively reducing a time in the rendering process, which facilitates in improving the fluency of playback of the animation.

In an embodiment, the data obtaining module 2014 is further configured to obtain, when or in response to determining that the animation file includes a plurality of animation layers, and the animation layers include the same vector graph of different sizes, animation rendering data corresponding to a vector graph of the largest size.

The data cache module 2006 is further configured to cache the animation rendering data corresponding to the vector graph of the largest size.

In the foregoing embodiment, when or in response to determining that the same vector graph appears in a plurality of layers, animation rendering data corresponding to a vector graph of the largest size is cached. On one hand, simultaneous caching of three pieces of animation rendering data may be avoided, thereby reducing the amount of occupied cache. On the other hand, caching the animation rendering data of the largest size avoids a problem of reduction of image definition caused by stretching the vector graph during display.

In an embodiment, the data cache module 2006 is further configured to: determine, when or in response to determining that the animation file includes a pre-composed attribute group, an animation region including first target animation rendering data in the pre-composed attribute group; determine, when or in response to determining that a size of a non-animation rendering data region included in the animation region reaches a preset condition, a minimum animation region including second target animation rendering data, the first target animation rendering data being a part of the second target animation rendering data; determine an intersection region between the obtained animation region and the minimum animation region; and determine the intersection region as an animation region of the pre-composed attribute group.

In the foregoing embodiment, when the animation region of the pre-composed animation attribute group includes a relatively large invalid region, the animation region may need to be re-determined, to ensure that the animation rendering data is included in the animation region, and the invalid region is reduced as much as possible. Therefore, it may be avoided that additional calculation may be required during rendering and the invalid region is scanned during transmission to a screen, thereby reducing a time consumed during transmission to a screen.

Figure 22:
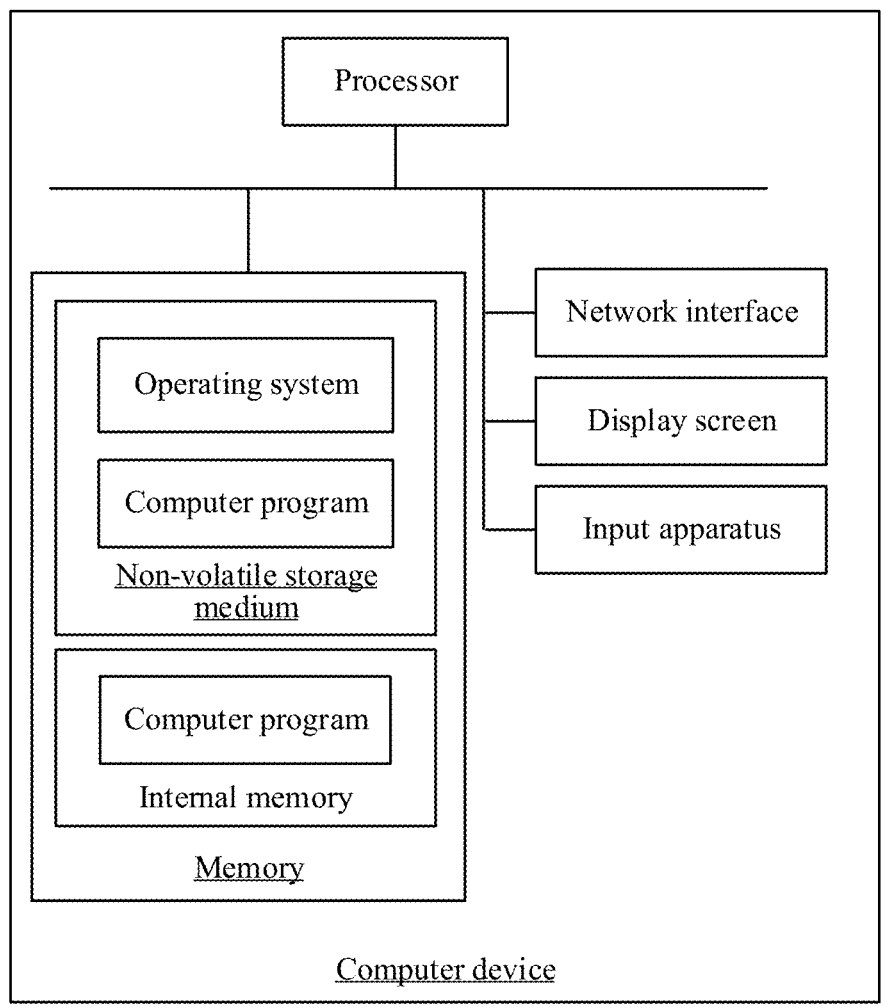
FIG. 22 is a schematic structural block diagram of a computer device according to one or more embodiments of the present disclosure.

FIG. 22 is a diagram of an internal structure of a computer device according to an embodiment. The computer device may be the terminal 110 in FIG. 1. As shown in FIG. 22, the computer device includes a processor, a memory, a network interface, an input apparatus, and a display screen that are connected by a system bus. The memory includes a non-volatile storage medium and an internal memory. The non-volatile storage medium of the computer device stores an operating system, and may further store a computer program. The computer program, when executed by the processor, may cause the processor to implement the animation rendering method. The internal memory may also store a computer program. The computer program, when executed by the processor, may cause the processor to perform the animation rendering method. The display screen of the computer device may be a liquid crystal display screen or an e-ink display screen. The input apparatus of the computer device may be a touch layer covering the display screen, or a button, a trackball, or a touchpad disposed on a housing of the computer device, or an external keyboard, touchpad, a mouse, or the like.

A person skilled in the art may understand that, the structure shown in FIG. 22 is merely a block diagram of a partial structure related to a solution in the present disclosure, and does not constitute a limitation to the computer device to which the solution in the present disclosure is applied. In certain embodiments, the computer device may include more or fewer components than those shown in the figure, or some components may be combined, or a different component deployment may be used.

In an embodiment, the animation rendering apparatus provided in the present disclosure may be implemented in the form of a computer program. The computer program may be run on the computer device shown in FIG. 22. The memory of the computer device may store program modules forming the animation rendering apparatus, for example, the file obtaining module 2002, the determining module 2004, the data cache module 2006, the data reading module 2008, and the animation rendering module 2010 shown in FIG. 20. The computer program formed by the program modules causes the processor to perform the steps of the animation rendering method in the embodiments of the present disclosure described in the present disclosure.

For example, the computer device shown in FIG. 22 may perform step S202 by using the file obtaining module 2002 in the animation rendering apparatus shown in FIG. 20. The computer device may perform S204 by using the determining module 2004. The computer device may perform S206 by using the data cache module 2006. The computer device may perform S208 by using the data reading module 2008. The computer device may perform S210 by using the animation rendering module 2010.

In an embodiment, a computer device is provided, including a memory and a processor, the memory storing a computer program, the computer program, when executed by the processor, causing the processor to perform steps of the foregoing animation rendering method. Herein, the steps of the animation rendering method may be the steps of the animation rendering method in the foregoing embodiments.

In an embodiment, a computer-readable storage medium is provided, storing a computer program, the computer program, when executed by a processor, causing the processor to perform steps of the foregoing animation rendering method. Herein, the steps of the animation rendering method may be the steps of the animation rendering method in the foregoing embodiments.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. References to the memory, the storage, the database, or other medium used in the embodiments provided in the embodiments of the present disclosure may all include a non-volatile and/or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a RAM or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink (Synchlink) DRAM (SLDRAM), a rambus (Rambus) direct RAM (RDRAM), a direct rambus dynamic RAM (DRDRAM), and a rambus dynamic RAM (RDRAM).

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Technical features of the foregoing embodiments may be combined. To make description concise, not all possible combinations of the technical features in the foregoing embodiments are described. However, the combinations of these technical features shall be considered as falling within the scope recorded by the present disclosure provided that no conflict exists.

The foregoing embodiments show only several implementations of the present disclosure and are described in detail, which, however, are not to be construed as a limitation to the patent scope of the present disclosure. For a person of ordinary skill in the art, several transformations and improvements can be made without departing from the idea of the present disclosure. These transformations and improvements belong to the protection scope of the present disclosure. Therefore, the protection scope of the patent of the present disclosure shall be subject to the appended claims.

What is claimed is:

1. An animation rendering method, performed by a computer device, the method comprising:
    obtaining an animation file in a target format;
    determining, in response to determining that the animation file is decoded, an animation drawing data interval meeting a stationary condition from animation drawing data obtained through decoding;
    caching initial animation drawing data in the animation drawing data interval;
    reading, in response to determining that animation drawing data corresponding to a to-be-played frame meets the stationary condition in a playback process of the animation file, the cached initial animation drawing data corresponding to the to-be-played frame; and
    performing animation rendering according to the read initial animation drawing data.

2. The method according to claim 1, wherein determining the animation drawing data interval comprises:
    decoding the animation file to obtain an animation file object;
    reading animation drawing data in the animation file object; and
    determining the animation drawing data interval meeting the stationary condition from the read animation drawing data.

3. The method according to claim 1, wherein the animation file includes at least one animation layer; each animation layer includes at least two animation attribute groups; each animation attribute group includes at least two animation attribute values; and wherein determining the animation drawing data interval comprises:
    determining, in response to determining that the animation file is decoded, animation attribute value intervals meeting the stationary condition in the each animation attribute group from the animation drawing data obtained through decoding;
    using an intersection between the animation attribute value intervals as a group drawing data interval of the each animation attribute group; and
    determining an intersection between the group drawing data intervals of the animation attribute groups as an animation drawing data interval of the animation layer.

4. The method according to claim 3, further comprising:
    caching initial animation attribute values of the animation attribute value intervals in response to determining that there is no intersection between the animation attribute value intervals;
    in response to determining that the animation drawing data corresponding to the to-be-played frame does not meet the stationary condition in the playback process of the animation file, and there is no intersection between the animation attribute value intervals,
    reading a cached initial animation attribute value corresponding to the to-be-played frame;
    obtaining animation attribute values that correspond to the to-be-played frame and do not meet the stationary condition from an animation file object obtained by decoding the animation file; and
    performing animation rendering according to the read initial animation attribute value and the obtained animation attribute values.

5. The method according to claim 3, further comprising:
    caching initial group drawing data of the group drawing data intervals in response to determining that there is an intersection between the animation attribute value intervals but no intersection between the group drawing data intervals;
    in response to determining that the animation drawing data corresponding to the to-be-played frame does not meet the stationary condition in the playback process of the animation file,
    reading cached initial group drawing data corresponding to the to-be-played frame;
    obtaining group drawing data that corresponds to the to-be-played frame and does not meet the stationary condition from an animation file object obtained by decoding the animation file; and
    performing animation rendering according to the read initial group drawing data and the obtained group drawing data.

6. The method according to claim 3, further comprising:
    determining the intersection between the animation attribute value intervals as an element interval of the each drawable element;
    calculating an intersection between the element intervals of the drawable elements; and
    determining the intersection between the element intervals as the group drawing data interval of the each animation attribute group.

7. The method according to claim 1, wherein further comprising:
    determining, in response to determining that the animation file is played in more than one application, a playback progress corresponding to each application; and
    in response to determining that animation drawing data of a to-be-played frame corresponding to the playback progress meets the stationary condition, reading initial animation drawing data that is cached, corresponds to the playback progress, and is shared by the more than one application.

8. The method according to claim 1, wherein the animation file includes a vector graph; and the method further comprises:
obtaining animation drawing data that is about the vector graph and obtained by decoding the animation file;
performing off-screen rendering on the animation drawing data, to obtain animation rendering data;
caching the animation rendering data; and
reading, in response to determining that a to-be-played frame is a vector graph animation frame in the playback process of the animation file, cached animation rendering data corresponding to the to-be-played frame.

9. The method according to claim 8, wherein performing the off-screen rendering on the animation drawing data comprises:
determining a size of an external container configured to display the vector graph;
determining a scale ratio of a size of the animation drawing data to the size of the external container;
creating an off-screen buffer; and
performing animation rendering on the animation drawing data according to the size of the external container and the scale ratio in the off-screen buffer, to obtain the animation rendering data.

10. The method according to claim 9, wherein determining the scale ratio comprises:
determining a first size ratio between an internal container carrying animation frames and the external container;
determining a second size ratio between the animation layer and the internal container;
determining a third size ratio between animation drawing data in a drawable element attribute group and the animation layer; and
determining the scale ratio according to the first size ratio, the second size ratio, and the third size ratio.

11. The method according to claim 10, further comprising:
obtaining a changed scale ratio in response to determining that ratios corresponding to nodes in a node tree have changed, the node tree being composed of the external container, the internal container, the animation layer, the drawable element attribute group, and the animation drawing data in the drawable element attribute group;
adjusting the size of the cached animation rendering data according to the scale ratio; or
obtaining an inputted scale ratio, and adjusting the size of the cached animation rendering data according to the inputted scale ratio.

12. The method according to claim 8, further comprising:
in response to determining that the animation file comprises a plurality of animation layers, and the animation layers comprise the same vector graph of different sizes,
obtaining animation rendering data corresponding to a vector graph of the largest size; and
the caching the animation rendering data comprises: caching the animation rendering data corresponding to the vector graph of the largest size.

13. The method according to claim 1, wherein after performing the animation rendering, the method further comprises:
determining, in response to determining that the animation file comprises a pre-composed attribute group, an animation region comprising first target animation rendering data in the pre-composed attribute group;
determining, in response to determining that a size of a non-animation rendering data region comprised in the animation region reaches a preset condition, a minimum animation region comprising second target animation rendering data, the first target animation rendering data being a part of the second target animation rendering data;
determining an intersection region between the obtained animation region and the minimum animation region; and
determining the intersection region as an animation region of the pre-composed attribute group.

14. An animation rendering apparatus, comprising: a memory storing computer program instructions; and a processor coupled to the memory and configured to execute the computer program instructions and perform:
obtaining an animation file in a target format;
determining, in response to determining that the animation file is decoded, an animation drawing data interval meeting a stationary condition from animation drawing data obtained through decoding;
caching initial animation drawing data in the animation drawing data interval;
reading, in response to determining that animation drawing data corresponding to a to-be-played frame meets the stationary condition in a playback process of the animation file, the cached initial animation drawing data corresponding to the to-be-played frame; and
performing animation rendering according to the read initial animation drawing data.

15. The animation rendering apparatus according to claim 14, wherein the processor is configured to execute the computer program instructions and further perform:
decoding the animation file to obtain an animation file object;
reading animation drawing data in the animation file object; and
determining the animation drawing data interval meeting the stationary condition from the read animation drawing data.

16. The animation rendering apparatus according to claim 14, wherein the processor is configured to execute the computer program instructions and further perform:
determining, in response to determining that the animation file is decoded, animation attribute value intervals meeting the stationary condition in the each animation attribute group from the animation drawing data obtained through decoding;
using an intersection between the animation attribute value intervals as a group drawing data interval of the each animation attribute group; and
determining an intersection between the group drawing data intervals of the animation attribute groups as an animation drawing data interval of the animation layer.

17. The animation rendering apparatus according to claim 16, wherein the processor is configured to execute the computer program instructions and further perform:
caching initial animation attribute values of the animation attribute value intervals in response to determining that there is no intersection between the animation attribute value intervals;
in response to determining that the animation drawing data corresponding to the to-be-played frame does not meet the stationary condition in the playback process of the animation file, and there is no intersection between the animation attribute value intervals, reading a cached initial animation attribute value corresponding to the to-be-played frame;

obtaining animation attribute values that correspond to the to-be-played frame and do not meet the stationary condition from an animation file object obtained by decoding the animation file; and performing animation rendering according to the read initial animation attribute value and the obtained animation attribute values.

18. A non-transitory computer-readable storage medium, storing a computer program, the computer program, when executed by a processor, causing the processor to perform:

obtaining an animation file in a target format;

determining, in response to determining that the animation file is decoded, an animation drawing data interval meeting a stationary condition from animation drawing data obtained through decoding;

caching initial animation drawing data in the animation drawing data interval;

reading, in response to determining that animation drawing data corresponding to a to-be-played frame meets the stationary condition in a playback process of the animation file, the cached initial animation drawing data corresponding to the to-be-played frame; and performing animation rendering according to the read initial animation drawing data.

19. The non-transitory computer-readable storage medium according to claim 18, wherein the computer program further causes the processor to perform:

decoding the animation file to obtain an animation file object;

reading animation drawing data in the animation file object; and determining the animation drawing data interval meeting the stationary condition from the read animation drawing data.

20. The non-transitory computer-readable storage medium according to claim 18, wherein the animation file includes at least one animation layer; each animation layer includes at least two animation attribute groups; each animation attribute group includes at least two animation attribute values; and wherein the computer program further causes the processor to perform:

determining, in response to determining that the animation file is decoded, animation attribute value intervals meeting the stationary condition in the each animation attribute group;

using an intersection between the animation attribute value intervals as a group drawing data interval of the each animation attribute group; and determining an intersection between the group drawing data intervals of the animation attribute groups as an animation drawing data interval of the animation layer.

* * * * *